(12) United States Patent
Balemarthy

(10) Patent No.: US 9,804,325 B2
(45) Date of Patent: Oct. 31, 2017

(54) FRAMEWORK FOR THE DESIGN OF OPTIMUM AND NEAR-OPTIMUM BROADBAND MULTI-MODE OPTICAL FIBERS BY CORE DOPING

(71) Applicant: OFS Fitel, LLC, Norcross, GA (US)

(72) Inventor: Kasyapa Balemarthy, Hyderabad (IN)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/725,226

(22) Filed: May 29, 2015

(65) Prior Publication Data

US 2015/0253498 A1   Sep. 10, 2015

Related U.S. Application Data

(63) Continuation-in-part of application No. PCT/US2015/013655, filed on Jan. 30, 2015.

(60) Provisional application No. 62/004,376, filed on May 29, 2014, provisional application No. 61/934,223, filed on Jan. 31, 2014.

(51) Int. Cl.
*G02B 6/028* (2006.01)
*G02B 6/036* (2006.01)

(52) U.S. Cl.
CPC ......... *G02B 6/0288* (2013.01); *G02B 6/0281* (2013.01); *G02B 6/03627* (2013.01); *G02B 6/03633* (2013.01)

(58) Field of Classification Search
None
See application file for complete search history.

(56) References Cited

U.S. PATENT DOCUMENTS

| | | | |
|---|---|---|---|
| 3,904,268 A | 9/1975 | Keck | |
| 4,057,320 A | 11/1977 | Marcatili | |
| 4,222,631 A | 9/1980 | Olshansky | |
| 7,315,677 B1 | 1/2008 | Li et al. | |
| 7,421,172 B2 | 9/2008 | Matthijse et al. | |
| 7,421,174 B2 | 9/2008 | Fleming, Jr. et al. | |
| 8,588,568 B2 | 11/2013 | Bookbinder et al. | |
| 8,965,163 B2 * | 2/2015 | Bookbinder | G02B 6/0288 385/124 |
| 9,110,220 B2 * | 8/2015 | Bickham | G02B 6/0288 |
| 9,329,335 B2 * | 5/2016 | Balemarthy | G02B 6/0288 |
| 2015/0253498 A1 * | 9/2015 | Balemarthy | G02B 6/0288 385/124 |
| 2015/0253499 A1 * | 9/2015 | Balemarthy | G02B 6/0288 385/124 |

* cited by examiner

*Primary Examiner* — Andrew Jordan
(74) *Attorney, Agent, or Firm* — Michael Urbano, Esq.

(57) ABSTRACT

Described is a technique for optimizing the design and manufacture of broadband MMFs. MMFs for use in CWDM applications are specifically described.

9 Claims, 8 Drawing Sheets

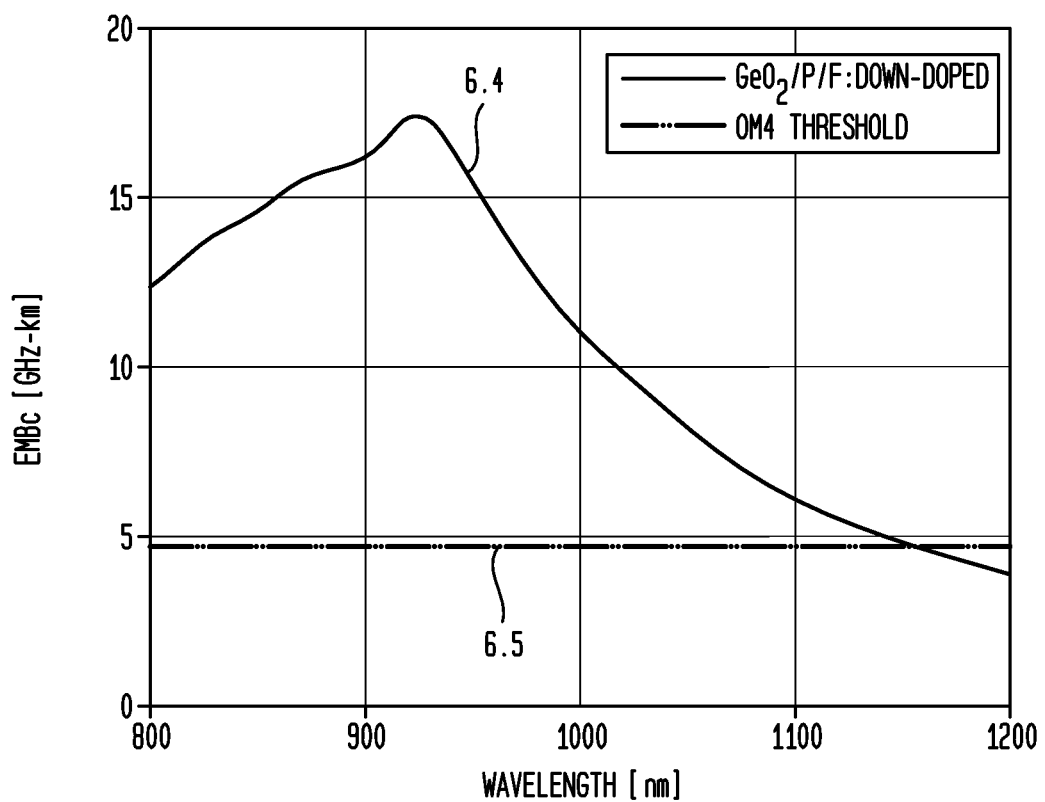

FRAMEWORK FOR THE DESIGN OF OPTIMUM AND NEAR-OPTIMUM BROADBAND MULTI-MODE OPTICAL FIBERS BY CORE DOPING

CROSS-REFERENCE TO RELATED APPLICATIONS

This application claims priority from provisional application Ser. No. 62/004,366 filed on May 26, 2014 and entitled "CWDM-Optimized Multimode Fiber Framework." This application is also a continuation-in-part of copending parent application Serial No. PCT/US15/13655 (Balemarthy et al. 1-60-16-24-1-8-65) filed on Jan. 30, 2015 and entitled "Design and Manufacture of Multi-mode Optical Fibers." Both of these applications are incorporated herein by reference.

BACKGROUND OF THE INVENTION

Field of the Invention

This invention relates to multimode optical fibers (MMFs) and, more particularly, to the design and manufacture of such fibers optimized for broadband applications, including coarse wavelength division multiplexing (CWDM).

Discussion of the Related Art

A typical MMF includes a relatively high-index core region surrounded by a lower index cladding region, with the two regions configured to support the simultaneous propagation of optical radiation in the core region in a plurality of transverse modes. The base material of MMFs is typically silica glass, with the core region being up-doped with one or more dopants (e.g., Ge, Al, P) that increase its refractive index and the cladding region being either undoped or down-doped with one or more dopants (e.g., F, B) that reduce its refractive index. In some designs, dopants such as F or B may also be added to the core region as long as the net refractive index of the core region is still greater than that of the cladding region.

The choice of a specific dopant (and its concentration profile) in the core and cladding regions may be dictated by design characteristics (e.g., index grading, NA, MFD) or performance issues (e.g., bandwidth), or may dictated by manufacturing/process problems associated with the use of a particular dopant (e.g., P).

More specifically, Ge-dopant is commonly used to form a near-parabolic index profile in the core region of a MMF. While the Ge-doped index profile in a MMF can be optimized to achieve a high bandwidth, the high material dispersion of Ge-doped silica limits the spectral width of the high bandwidth region. It is known that both P and F doped silica have much smaller material dispersion relative to Ge-doped silica, and fibers made with P- and/or F-dopants have much wider spectral width than conventional Ge-doped fiber [1]. However, it is difficult to introduce a high P-dopant concentration during preform processing because P-doped silica has a high vapor pressure, and a significant fraction of P-dopant is burned off during preform collapse. It is also difficult to maintain a circular preform core containing a high P-concentration because of its much lower viscosity than the surrounding silica substrate tube.

Furthermore, upon exposure to either hydrogen or radiation, fibers containing a high P-concentration have a significantly higher added attenuation, and the added attenuation increases monotonically with the P-dopant concentration. Therefore, it is desirable to limit the P-concentration in the fiber core region.

Thus, a combination of dopants including but not limited to Ge, P, Al, B, and F is required to satisfy both the material dispersion properties imposed by the required broadband (e.g., CWDM) operation as well as to resolve the above manufacturing issues. In the prior art, MMFs have been analyzed and designed using the so-called "α-profile" to reduce modal dispersion, where the refractive index profile shape of the core region is substantially parabolic. Such a procedure may be too restrictive to achieve effective CWDM-optimized MMFs while at the same time addressing process/manufacturing issues.

Modal dispersion is a significant impairment that limits the bit rates and/or the reach of MMF links. Grading the refractive index profile by slowing down the modes propagating along the fiber axis compared to the skew modes mitigates modal dispersion. Such fibers can be mathematically described by their refractive index n(r):

$$n(r) = \begin{cases} n_1\left[1 - 2\Delta\left(\frac{r}{a}\right)^\alpha\right]^{1/2}, & r \leq a \\ n_0, & r \geq a \end{cases} \quad (1)$$

$$\Delta = \frac{n_1^2 - n_0^2}{2n_1^2}$$

where $n_1$ is the refractive index at the center of the core region, and $n_0$ is the refractive index at the core region radius r=a. The parameter α describes the index grading with α=2 corresponding to a parabolic profile and α→∞ resulting in a step-index profile. Analysis of the propagation characteristics of such graded index fibers by Gloge and Maractili [1] suggested that the optimum α is given by α=(2−2Δ). However, subsequent analysis by Keck and Olshansky [2] showed that the optimum α is given by:

$$\alpha = 2 + y - \frac{\Delta(4+y)(3+y)}{(5+2y)} \quad (2)$$

where y, the profile dispersion parameter, characterizes the dispersion difference between the core and the cladding and is defined by:

$$y = -\frac{2n_1}{N_1} \cdot \frac{\lambda}{\Delta} \cdot \frac{d\Delta}{d\lambda} \quad (3)$$

where λ is the wavelength of signal light propagating in the core region and $N_1 = n_1 - \lambda dn_1/d\lambda$ is the group index at the center of the core region. We emphasize that the optimization metric in the Keck and Olshansky approach was the RMS pulse-width at the given wavelength assuming that all mode groups are equally excited. The pure α-profile multimode fiber, equation (1), is typically achieved by doping silica with an appropriate dopant such as $GeO_2$ or $P_2O_5$ or F or $B_2O_3$ etc. The dopant mix employed can result in variation of the profile dispersion parameter with wavelength. As a consequence, graded index fibers optimized at one wavelength as per Keck and Olshansky's approach can have considerable performance degradation at other wavelengths.

Before we discuss prior art related to the design of wideband (i.e., broadband) MMFs, we note that another consequence of the dopant mix used in α-profile fibers is that the profile dispersion parameter y can vary radially. However, Keck and Olshansky had assumed that the y-parameter is constant across the core region. This discrepancy was noted by Marcatili and a more general class of fibers with arbitrary profile dispersion, that depends on the radius, was analyzed [3],[4]:

$$n^2(r,\lambda)=n_1^2[1-F(r,\lambda)], F(r=0,\lambda)=0, F(r=a,\lambda)=2\Delta \qquad (4)$$

where $F(r,\lambda)$ is the arbitrary profile function. Marcatili showed that if the derivatives of $F(r,\lambda)$ with respect to radius and wavelength satisfy:

$$1 + \frac{r}{2F} \cdot \frac{\partial F}{\partial r} = D(\lambda)\left[1 - \frac{\rho}{2}\right] \qquad (5)$$

with the arbitrary profile dispersion parameter, ρ, defined as:

$$\rho(r,\lambda) = \frac{n_1}{N_1} \cdot \frac{\lambda}{F} \cdot \frac{\partial F}{\partial \lambda} \qquad (6)$$

then the group delays τ depend only on D and the propagation constant β as follows:

$$\tau = \frac{N_1}{c}\left[\frac{1 - B/D}{\sqrt{1-B}}\right], B = 1 - \frac{\beta^2}{n_1^2 k_0^2}, k_0 = \frac{2\pi}{\lambda} \qquad (7)$$

Marcatili chose the parameter D to minimize the worst-case modal dispersion at a particular wavelength resulting in D≈(2−Δ) [4].

Designing a MMF for operation over a wide range of wavelengths using a single α-profile requires multiple dopants. Furthermore, the required dopant concentrations can be sufficiently high to cause manufacturability problems related to viscosity, thermal expansion among others, [6]. Sometimes the feasible NA was lower than required from a light transmission perspective. In order to circumvent these problems, Olshansky proposed multiple-α refractive index profiles [5],[6]:

$$F(r,\lambda) = \sum_i^N 2\Delta_i(\lambda)\left(\frac{r}{a}\right)^{\alpha_i} \qquad (8)$$

Equation (5) when applied to this profile function yields the optimum $\alpha_i$ at any wavelength, $$\alpha_i = 2 - \frac{2n_1}{N_1} \cdot \frac{\lambda}{\Delta_i} \cdot \frac{d\Delta_i}{d\lambda} - \frac{12\Delta}{5}, \sum_{i=1}^N \Delta_i = \Delta \qquad (9)$$

where Olshansky chose D≈(2−6Δ/5) to minimize the RMS pulse-width. The parameters $\Delta_i$ are chosen to achieve wideband performance which is enforced by requiring:

$$\frac{d\alpha_i}{d\lambda} = 0, \text{ or } \alpha_i(\lambda_1) = \alpha_i(\lambda_2) = \ldots = \alpha_i(\lambda_q) \qquad (10)$$

Olshansky further assumes employing m dopants whose concentration $C_j$ is given by:

$$C_j(r) = C_{j0} + \sum_{i=1}^N C_{ji}\left(\frac{r}{a}\right)^{\alpha_i}, j=1,\ldots,m, 0 \le r \le a \qquad (11)$$

where $C_{j0}$ is the dopant concentration at the center of the core region (r=0) and $C_{ji}$ is the additional concentration at the radius (r=a) of the core region. The design process involves determining these dopant concentrations such that both the wideband requirements imposed by equation (10) as well as the NA specification are satisfied. Olshansky [5],[6] and later M-J. Li et al. [7] and D. C. Bookbinder et al. [8] discuss the specific case of two dopants and two α's. In this case, the two dopant concentrations can be re-cast in the form (for 0≤r≤α):

$$C_1(r) = C_{10} - (C_{10} - C_{1a})\left[(1-x_1)\left(\frac{r}{a}\right)^{\alpha_1} + x_1\left(\frac{r}{a}\right)^{\alpha_2}\right] \qquad (12)$$

$$C_2(r) = C_{20} - (C_{20} - C_{2a})\left[x_2\left(\frac{r}{a}\right)^{\alpha_1} + (1-x_2)\left(\frac{r}{a}\right)^{\alpha_2}\right] \qquad (13)$$

where $C_{ja}$ is the dopant concentration at the core region radius r=a. It should be noted that all these fiber designs rely on the original multiple-α profile theory formulated by Olshansky [5], [6] and differ only in the particular dopants considered. Specifically, Olshanky considered the case of dopant 1 being $GeO_2$ and dopant 2 being $B_2O_3$ with $C_{Gea}=0$ and $C_{BG}=0$ and derived an approximate set of equations to solve for $x_1$, $x_2$ [5],[6]. Li et al. supra considered the case of $GeO_2$ and F without assuming $C_{1a}=0$ and $C_{20}=0$ [7]. Bookbinder et al. supra further considered the use of $P_2O_5$ as a co-dopant in addition to $GeO_2$, while including trench-based bend-insensitive MMF designs. While later work by Matthijse et al. [9] refer to MMF designs with $GeO_2$ and F, characteristics of the dopant profiles mentioned therein were already observed in profiles governed by equations (12)-(13) in the prior work by Li [7].

In contrast to the above dopant profiles being governed by single/multiple-α's, the work by Fleming and Oulundsen [10] indicates that MMF designs with non-parabolic dopant concentration profiles can result in wideband operation over the 780-1550 nm wavelength window.

The dopant concentrations in all the prior art described thus far stem from either an assumed dopant profile function consisting of single/multiple-α's or from ad hoc procedures. As a consequence, it is not clear whether the resulting dopant concentrations are indeed optimal from a wideband perspective. In fact, an adequate definition of optimality of wideband MMF designs with arbitrary profile shapes has not been properly established in the literature. While Olshansky imposes the constraint defined by equation (10), it already assumes the presence of a multiple-α dopant profile [5],[6]. On the other hand, Marcatili supra specifies the following criterion for wideband optimality for the more general class of fibers defined by equation (5):

$$\frac{dD}{d\lambda} = 0 \qquad (14)$$

Since the parameter D has previously been chosen to be $D(\lambda) \approx 1 + \sqrt{1-2\Delta(\lambda)} \approx [2-\Delta(\lambda)]$ as per Marcatili [3],[4] or $D(\lambda) \approx [2-6\Delta(\lambda)/5]$ as per Olshansky [5],[6], its wavelength dependence is automatically defined. Therefore, ensuring $$\frac{dD}{d\lambda} = 0$$

requires the fiber $\Delta$ to be wavelength independent to the first order. Once the dopant concentrations at the core region center (r=0) and at the interface between the core and cladding regions (r=a) have been chosen to satisfy the specified NA at the design wavelength, the behavior of $\Delta(\lambda)$ is purely a function of the material properties. Therefore, satisfying equation (14) is not feasible and hence this optimality criterion is itself suspect. Consistent with this observation, it can be shown that the optimality criterion proposed by Olshansky for multiple-α profiles, equation (10), is not in agreement with that proposed by Marcatili, equation (14).

Thus, the prior art lacks an adequate optimality criterion for wideband operation with arbitrary profile shapes and also a systematic procedure for designing MMFs that satisfy the optimality criterion. Yet another limitation of the prior art [5]-[8] related to the multiple α profile designs [Olshansky, Li, supra] is the case where the dopant concentration at the interface between the core/cladding regions (r=a) is the same as that at the core region center (r=0); i.e., $C_{2a} = C_{20}$. From equation (13), it follows that the dopant concentration $C_2(r) = C_{20}$; i.e., $C_2(r)$ is constant across the core region. As described below, the invention includes MMF designs where even in this case, the dopant profile does not need to be constant, yet will still satisfy the wideband optimality criteria proposed herein.

REFERENCES

The following references have been cited above and many will be cited also in the description that follows. Each of these references is incorporated herein by reference:

[1] D. Gloge and E. A. J. Marcatili, "Multimode Theory of Graded-Core Fibers," BSTJ, vol. 52, no. 9, pp. 1563-1578 (November 1973);
[2] D. Keck and R. Olshansky, U.S. Pat. No. 3,904,268 (September 1975);
[3] E. A. J. Marcatili, "Modal Dispersion in Optical Fibers with Arbitrary Numerical Aperture and Profile Dispersion," BSTJ, vol. 56, no. 1, pp. 49-63 (January 1977);
[4] E. A. J. Marcatili, U.S. Pat. No. 4,057,320, (November 1977);
[5] R. Olshansky, "Multiple-α Index Profiles," Applied Optics, vol. 18, no. 5, pp. 683-689 (Mar. 1, 1979);
[6] R. Olshansky, U.S. Pat. No. 4,222,631 (September 1980);
[7] M-J Li, D. A. Nolan and P. Tandon, U.S. Pat. No. 7,315,677 (January 2008);
[8] D. C. Bookbinder, M. J. Li, and P. Tandon, U.S. Pat. No. 8,558,568 (November 2013);
[9] P. Matthijse, M. J. N. Stralen, M. P. M. Jetten and G-J. Krasbshuis, U.S. Pat. No. 7,421,172 (September 2008);
[10] J. W. Fleming Jr., G. E. Oulundsen III, U.S. Pat. No. 7,421,174 (September 2008); and
[11] G. Strang, *Linear Algebra and Its Applications*, Cengage, 4$^{th}$ Ed. (2006)

SUMMARY OF THE INVENTION

In accordance with one aspect of the invention, a broadband MMF comprises a core region configured for broadband operation at wavelengths within a predetermined wavelength range $\Lambda$, and a cladding region surrounding the core region. The core and cladding regions are configured to support the simultaneous propagation of optical radiation in the core region in a plurality of transverse modes; that is, the fiber is a multimode fiber. The core region is co-doped with a plurality of dopants, the concentrations and distribution of the dopants being radially varied within the transverse cross-section of the core region so that the refractive index of the core region is radially graded and so that variations in $z(r,\lambda)$ with respect to wavelength are reduced, where, as described in co-pending parent application Balemarthy et al., $$z(r,\lambda) \triangleq n^2(r,\lambda) k_0^2, \tag{15}$$

$k_0$ is the wave number, $n(r,\lambda)$ is the refractive index profile, and wherein the concentrations and distribution of the dopants are radially varied within the transverse cross-section of the core region so that $$\left| \frac{d[z(r,\lambda) - z_{cl}(\lambda)]}{d\lambda} \right| \leq \epsilon_1 \text{ for } \lambda \in \Lambda \tag{15a}$$

where $z_{cl}(\lambda)$ is z of the cladding region and $\epsilon_1$ is a tolerance factor.

In some embodiments of the present invention, the MMF designs are optimal in a well-defined sense described below; in other embodiments the designs are near-optimal in a well-defined different sense, also described below.

In optimal design embodiments, the core region of radius r=a of an inventive broadband MMF comprises I different dopants having concentration profiles $X_i(r)$, i=1, 2, . . . , I within the core region and has a refractive index profile $n(r,\lambda)$, said dopant concentration profiles being configured so that the following criteria are satisfied:

(1) a profile function $f(r,\lambda)$ is defined by $f(r,\lambda) = z_0 - z(r,\lambda)$, $z_0 = z(r=0,\lambda)$, where $\lambda$ is the wavelength of signal light propagating in said core region and
(2) $z(r,\lambda) = n^2(r,\lambda) k_0^2$, $k_0 = 2\pi/\lambda$, where $k_0$ is the wave number and
(3) $f(r=0,\lambda) = f_0 = 0$, $f(r=a,\lambda) = f_a = (NA \cdot k_0)^2$, where NA is the numerical aperture of the MMF and equation (3) satisfies equation (4) below,
(4)

$$f^{(i-1)} + \frac{r}{2} \frac{\partial f^{(i-1)}}{\partial r} = [df^{(1)}]^{(i-1)},$$

i=1, 2, . . . , I, where the i$^{th}$ order derivative of a quantity x with respect to $k_0$ is denoted by $x^{(i)} = \partial^i x / \partial k_0^i$ and the parameter d is given by $$d = \frac{Dz_0}{z_0^{(1)}};$$

and
(5) the profile function $f(r,\lambda)$ is related to said dopant concentrations $X_i(r)$, i=1, 2, . . . , I by $f(r,k_0) = \Sigma_{i=1}^I x_i(r) e_i(k_0)$, $x_i(r) = X_i(r=0) - X_i(r)$ with $e_i(k_0) = z_{i_R}(k_0) - z_S(k_0)$ where $z_{i_R}(k_0)$ is the z due to a reference amount of dopant concentration for dopant i and $z_S$ is the z due to pure silica.

On the other hand, in near-optimal design embodiments, the core region of radius r=a of an inventive broadband MMF comprises I different dopants having concentration profiles $X_i(r)$, i=1, 2, ..., I within the core region and has a refractive index profile $n(r,\lambda)$, the dopant concentration profiles being configured so that the following criteria are satisfied:

(1) a profile function $f(r,\lambda)$ is defined by $f(r,\lambda)=z_0-z(r,\lambda)$, $z_0=z(r=0,\lambda)$, where $\lambda$ is the wavelength of signal light propagating in said core region and $z(r,\lambda)=n^2(r,\lambda)k_0^2$, $k_0=2\pi/\lambda$, where $k_0$ is the wave number, (2) the dopant concentration profiles $X_i(r)$, or equivalently, $x_i(r)=X_i(r=0)-X_i(r)$, is configured to minimize the metric:

$$\xi = \sum_{j=2}^{I} w_j \left\| \sum_{i=1}^{I} \left[\frac{dx_i}{dr}\right] e_i^{(j-1)}(k_0) - \sum_{i=1}^{I} x_i(r) p_i^{(j-1)}(k_0) \right\|^2$$

where $\|\cdot\|^2$ is the $L_2$-norm, with $e_i(k_0)=z_{i_R}(k_0)-z_S(k_0)$ where $z_{i_R}(k_0)$ is the z due to a reference amount of dopant concentration for dopant i and $z_S$ is the z due to pure silica; $p_i(k_0)=2de_i^{(1)}-2e_i$ and $w_j$ is the weight on the $j^{th}$ order derivative of said profile function $f(r,\lambda)$; Note that the $i^{th}$ order derivative of a quantity x with respect to $k_0$ is denoted by $x^{(i)}=\partial_i x/\partial k_0^i$, (3) the minimization is subject to the equality criterion:

$$\sum_{i=1}^{I} \left[r\frac{dx_i}{dr}\right] e_i^{(0)}(k_0) = \sum_{i=1}^{I} x_i(r) p_i^{(0)}(k_0),$$

where $x_i(r)$ is pre-specified for some $r\in[0,\alpha]$, and (4) the minimization is also subject to the inequality constraints: $x_{i,min} \leq x_i(r) \leq x_{i,max}$, where $x_{i,min}=X_i(r=0)-X_{i,max}$, $x_{i,max}=X_i(r=0)$.

In accordance with another aspect of the invention, a method of manufacturing a broadband MMF comprises the steps of determining the concentration and distribution profiles of the dopants in the core region via either the optimum or near optimum approaches described above, and providing those profiles to the inputs of a deposition system that produces an optical fiber preform of the MMF. The preform may then be subject to standard drawing operations to produce a multimode optical fiber.

In accordance with some embodiments of the invention, a method of fabricating an optical fiber comprises the steps of: (i) determining a collection of fiber data including, for example, desired performance characteristics, desired structural characteristics, desired numerical aperture and bandwidth, particular dopants that will be incorporated into the core region; (ii) setting up a numerical optimization code to generate the dopant concentration profiles of each of the dopants by reducing the variation of $z(r,\lambda)$ with respect to wavelength, where $z(r,\lambda)$ is defined by equation (15); (iii) setting up numerical code to perform either steps (1)-(5) of the optimum design procedure above or steps (1)-(4) of the near-optimum design procedure above; and (iv) providing the dopant concentration profiles to a deposition system that produces an optical fiber preform in which the concentration of each dopant in the preform's core region corresponds to the inputted profiles. The desired optical fiber may then be drawn from the preform.

BRIEF DESCRIPTION OF THE SEVERAL VIEWS OF THE DRAWING

The invention, together with its various features and advantages, can be readily understood from the following more detailed description taken in conjunction with the accompanying drawing, in which:

FIG. 3A is for the optimum Ge/F design of FIG. 2A, and FIG. 3B is for a Ge-only design;

FIG. 6C shows the effective modal bandwidth (EMBc; computed) corresponding to the Ge/P/F MMF optimum design of FIG. 6A. The threshold for OM4 compliance is shown for reference;

Figure 1A:
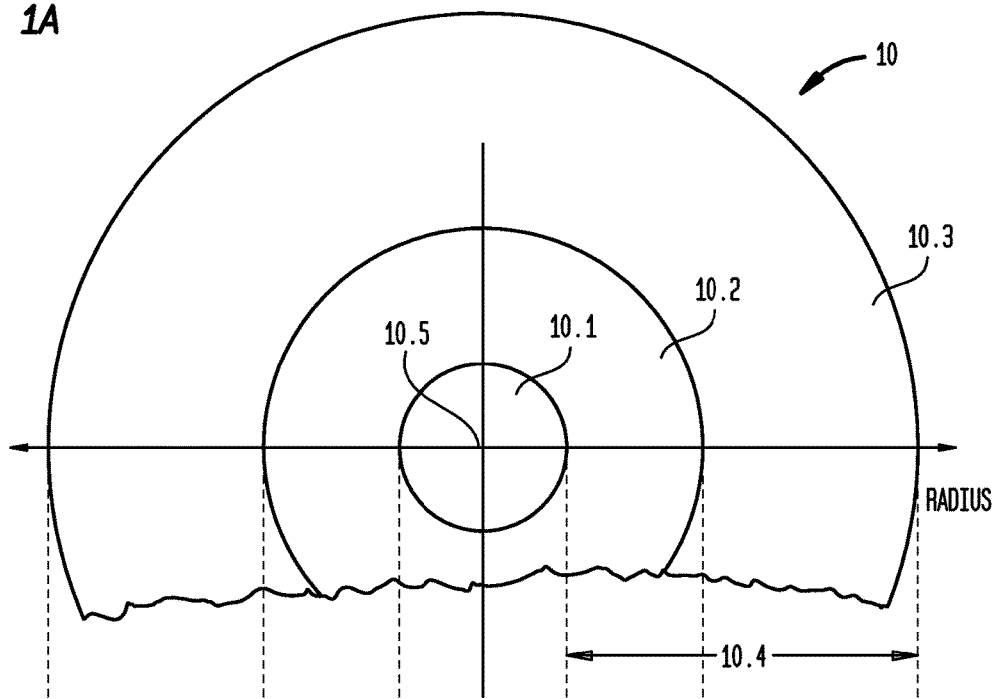
FIG. 1A is a partially cut-away view of a schematic, transverse cross-section of a MMF in accordance with an illustrative embodiment of the invention.

Various ones of the foregoing figures are shown schematically in that they are not drawn to scale and/or, in the interests of simplicity and clarity of illustration, do not include all of the details of an actual optical fiber or product depicted.

GLOSSARY

Broadband: The term bandwidth refers to the wavelength range $\Lambda$ over which a fiber, device, apparatus or system is intended to operate. The term broadband refers to a bandwidth that is relatively large (wide), depending on the intended application. For example, silica glass MMFs are considered to be broadband fibers if they are designed to operate over a wavelength range of 780 nm-1550 nm in some applications, or over a range of 780 nm-1300 nm in other applications. The term broadband is used herein interchangeably and synonymously with the term wideband.

Center Wavelength: Throughout this discussion references made to wavelength are intended to mean the center wavelength of a particular light emission, it being understood that all such emissions have a characteristic linewidth that includes a well-known range of wavelengths above and below the center wavelength.

Down-doped Cladding: The phrase down-doped cladding region, or simply down-doped MMF, means the refractive index of the entire cladding region (both the inner and outer cladding regions) is below that of pure silica.

Glass Fiber: Optical fiber of the type described herein is typically made of glass (e.g., silica) in which the refractive indices of the core region and of the cladding region are controlled by the amount and type of one or more dopants (e.g., P, Al, Ge, F, Cl) or by hollow voids incorporated therein during the fabrication of the fiber, as is well known in the art. These refractive indices, as well as the thicknesses/diameters of core/cladding regions, determine important operating parameters, as is well known in the art.

Index: The terms index and indices shall mean refractive index and refractive indices. In designs where a particular region (e.g., a cladding region) includes microstructure [e.g., holes, whether filled (e.g., with a low-index gas, liquid or solid) or unfilled (e.g., air-holes)], then the index of such a region is intended to mean the average index seen by light propagating in that region.

Index Profile: The schematic index profiles (e.g., FIGS. 1B-1C) depict averages of the actual minute variations of index that would be observable in an optical fiber. In addition, although various regions of the index profile may be shown as being rectangular, the boundaries of such regions need not be horizontal or vertical; one or more may be slanted, for example, the region may be trapezoidal or triangular. The term composite index profile of a region (e.g., core) results from the combination of the dopant concentration profiles of dopants within that region.

Mode: The term mode(s) shall mean the transverse mode(s) of an electromagnetic wave (e.g., signal light, which includes signal light to be amplified in the case of an optical amplifier or the stimulated emission in the case of a laser).

Multimode: The term multimode means the fiber is capable of supporting the propagation of more than one mode simultaneously. Many-moded fibers, as well as few-moded fibers, are both embraced within the scope of the invention.

Radius/Diameter: Although the use of the terms radius and diameter in the foregoing (and following) discussion implies that the transverse cross-sections of the various regions (e.g., core, trench, cladding) are circular and/or annular, in practice these regions may be non-circular; for example, they may be rectangular, elliptical, polygonal, irregular or other more complex shapes. Nevertheless, as is common in the art, we frequently use the terms radius and/or diameter for simplicity and clarity.

Signal Propagation: Although signal light may actually crisscross the longitudinal axis of the fiber as it propagates along a fiber, it is well understood in the art that the general direction of propagation is fairly stated as being along that axis (e.g., axis 10.5 of FIG. 1A).

Transverse Cross-Section: The phrase transverse cross-section means a cross-section of fiber in a plane perpendicular to the longitudinal axis of the fiber.

Undoped: The term undoped or unintentionally doped means that a region of a fiber, or a starting tube used to form such a region, may contain a dopant not intentionally added to or controlled in the region during fabrication, but the term does not exclude low levels of background doping that may be inherently incorporated during the fabrication process. The term pure silica means that a silica body (e.g., an outer cladding) is undoped.

DETAILED DESCRIPTION OF THE INVENTION

General Fiber Structure

Figure 1B:
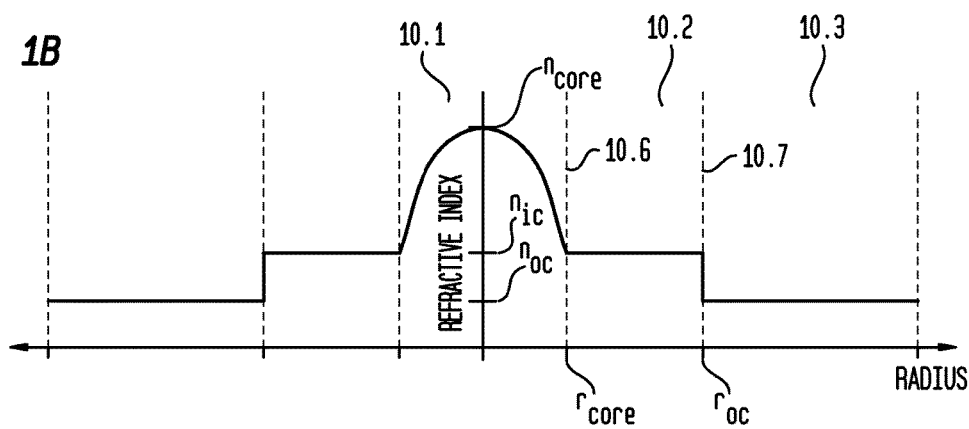
FIG. 1B shows an illustrative refractive index profile of another embodiment of the MMF of FIG. 1A along a diameter of the fiber.
Figure 1C:
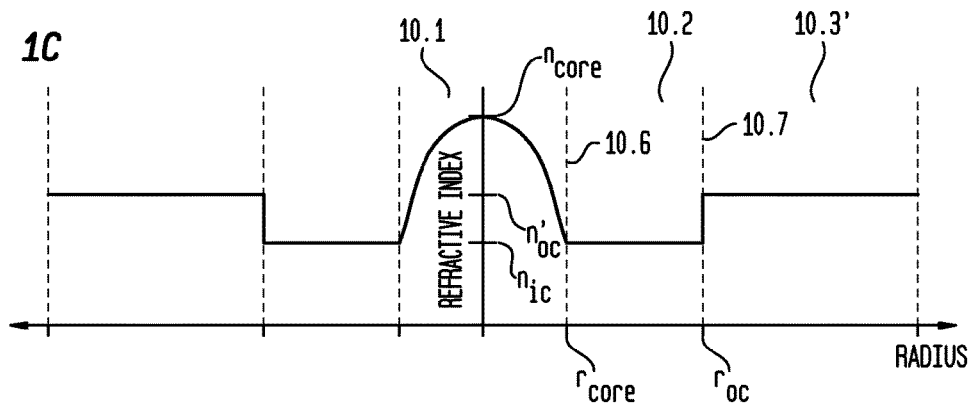
FIG. 1C shows another illustrative refractive index profile of one more embodiment of the MMF of FIG. 1A along a diameter of the fiber.

In accordance with some embodiments of the invention, as shown in FIGS. 1A, 1B, & 1C, a multimode, silica optical fiber 10 comprises a relatively high index ($n_{core}$) silicate core region 10.1 surrounded by an annular, lower index cladding region 10.4. The cladding region 10.4 includes an outer cladding region 10.3 (index $n_{oc}$) surrounding an inner cladding region 10.2 (index $n_{ic}$), which in turn surrounds the core region 10.1. Thus, the inner cladding region 10.2 extends from the outer edge 10.6 (at $r=r_{core}$) of the core region 10.1 to the inner edge 10.7 (at $r=r_{oc}$) of the outer cladding region 10.3. Depending on the design, the outer cladding region 10.3 may have a refractive index that is below that of the inner cladding region 10.2; that is, $n_{oc} < n_{ic}$ (FIG. 1B), or above that of the inner cladding region 10.2; that is, $n_{oc}' > n_{ic}$ (FIG. 1C), or substantially equal to that of the inner cladding region 10.2; that is, $n_{oc}' \sim n_{oc}$ (not shown).

In addition, the refractive index of the core region 10.1 is graded from a maximum ($n_{core}$) at or near its center (longitudinal axis 10.5) to a minimum ($n_{ic}$) at its interface 10.6 with the inner cladding region 10.2. Typically the grading profile is approximately parabolic.

In accordance with some embodiments of the invention, the core region 10.1 comprises silica co-doped with suitable amounts of one or more of the following dopants: P (e.g., a phosphorous oxide such as $P_2O_5$), Ge (e.g., a germanium oxide such as $GeO_2$), Al (e.g., an aluminum oxide such as $Al_2O_3$) and F. In general, $P_2O_5$, $GeO_2$ and $Al_2O_3$ are used to increase the refractive index of silica, whereas F is used to decrease it. Importantly, however, the specific compositions of the co-dopants and their distribution within the core region are determined by application of equations (2) and (3), as described below, to produce a broadband MMF having an NA of approximately 0.2 and a bandwidth of approximately 780-1550 nm.

Designing Optimal Broadband MMFs

The following exposition describes a design approach in accordance with illustrative embodiments of the invention that are applicable to MMFs for use in broadband (e.g., CWDM) systems. It will be apparent to those skilled in the art, however, that the same approach may be readily applied to the design of MMFs for use in other applications.

Copending parent application Serial No. PCT/US15/13655 (Balemarthy et al. 1-60-16-24-1-8-65) describes a general framework based on the light propagation equations, which is a fundamental departure from the prior art approach to broadband MMF design. In accordance with one aspect of Balemarthy et al. 1, which is incorporated herein by reference, a broadband optical fiber comprises a core region configured for broadband operation at wavelengths within a predetermined wavelength range Λ, and a cladding region surrounding the core region. The core and cladding regions are configured to support the simultaneous propagation of optical radiation in the core region in a plurality of transverse modes; that is, the fiber is a multimode fiber (MMF). The core region is co-doped with a plurality of dopants, the concentrations and distribution of the dopants being radially varied within the transverse cross-section of the core region so that the refractive index of the core region is radially graded and so that variations in z(r,λ) with respect to wavelength are reduced (preferably minimized), where $$z(r,\lambda) \triangleq n^2(r,\lambda)k_0^2, \tag{15}$$

$k_0=2\pi/\lambda$ is the wave number, $n(r,\lambda)$ is the refractive index profile, and wherein the concentrations and distribution of the dopants are radially varied within the transverse cross-section of the core region so that $$\left|\frac{d[z(r,\lambda) - z_{cl}(\lambda)]}{d\lambda}\right| \le \epsilon_1 \text{ for } \lambda \in \Lambda \tag{15a}$$

where $z_{cl}(\lambda)$ is z of the cladding region and $\epsilon_1$ is a tolerance factor.

Light propagation in a MMF with an arbitrary refractive index profile $n(r,\lambda)$ is governed by equation (15). In order to simplify the analysis, we define the profile function $f(r,\lambda)$ as follows:

$$f(r,\lambda)=z_0-z(r,\lambda), z_0=z(r=0,\lambda) \tag{16}$$

The profile function at the center of the core $f(r=0,\lambda)$ as well as at the core/cladding edge $f(r=a,\lambda)$ are given by:

$$f(r=0,\lambda)=f_0=0, f(r=a,\lambda)=f_a=(NA \cdot k_0)^2 \tag{17}$$

where a is the core radius and NA is the numerical aperture.

This invention will focus on the general family of MMFs defined by Marcatili, equation (5), which can now be characterized by:

$$f(r, k_0) + \frac{r}{2}\frac{\partial f(r, k_0)}{\partial r} = d(k_0)f^{(1)}(r, k_0), d = \frac{Dz_0}{z_0^{(1)}} \tag{18}$$

where the $i^{th}$ order derivative of a quantity x with respect to $k_0$ is denoted by $x^{(i)}=\partial^i x/\partial k_0^i$. (Two illustrative values of D were given previously, one follows equation (7), the other equation (9).

For a multimode fiber with I dopants, we propose the following wideband design optimization criteria:

$$f^{(i-1)} + \frac{r}{2}\frac{\partial f^{(i-1)}}{\partial r} = [df^{(1)}]^{(i-1)}, i = 1, 2, \ldots, I \tag{19}$$

Requiring a wideband fiber with I dopants to satisfy I separate equations implicitly provides control of the $I^{th}$ order derivatives of the profile function with respect to wavelength. The values of d(i) can be easily computed from equation (18) with the D parameter set to either (2−Δ) (as per Marcatili) or (2−6Δ/5) (as per Olshansky).

The material properties for different dopants such as refractive index, group index, dispersion, dispersion slope can be computed from the corresponding Sellmeier coefficients; i.e., each dopant has a set of Sellmeier coefficients, as is well known in the art. To keep the analysis tractable, we assume that the square of the refractive index is proportional to the dopant concentration; i.e., $$X = \frac{n^2(k_0) - n_s^2(k_0)}{n_R^2(k_0) - n_s^2(k_0)} = \frac{z(k_0) - z_s(k_0)}{z_R(k_0) - z_s(k_0)} \tag{20}$$

where the dopant concentration X is expressed in mole fractions and $n_s(k_0)$ is the refractive index of pure (undoped) silica, $n_R(k_0)$ is the refractive index with only the dopant (no silica), and $n(k_0)$ is the desired refractive index after doping pure silica with this particular dopant. We will utilize an equivalent version of equation (20):

$$z(k_0)-z_s(k_0)=X \cdot e_R(k_0), e_R(k_0)=z_R(k_0)-z_s(k_0) \tag{21}$$

Therefore, an arbitrary profile function with I dopants can be expressed as:

$$f(r,k_0)=\Sigma_{i=1}^I x_i(r)e_i(k_0), x_i(r)=X_i(r=0)-X_i(r) \tag{22}$$

where $X_i(r)$ is the dopant concentration profile for the $i^{th}$ dopant. The class of fibers defined by equation (18) can be equivalently described by:

$$\sum_{i=1}^{I}\left[r\frac{dx_i}{dr}\right]e_i(k_0) = \sum_{i=1}^{I} x_i(r)p_i(k_0), \tag{23}$$

$$p_i(k_0) = 2de_i^{(1)} - 2e_i$$

The parameter D and hence d is determined via:

$$d = \frac{(2-\mu)z_0 + \mu z_s}{z_0^{(1)}}, \tag{24}$$

$$z_0 = z_s + \sum_{i=1}^{I} X_i(r=0)e_i(k_0)$$

where μ is an appropriately chosen constant. Illustratively, in the case of Marcatili μ≈0.5, where the worst-case group delay spread at $k_0$ is minimized, and in the case of Olshansky μ≈0.6, where the RMS pulse-width is minimized. Choices of μ in the range 0.0<μ≤1.0 correspond to differing amounts of control on the group delay spread. The dopant concentrations at the center of the core $X_i(r=0)$ are assumed to be known a priori.

The wideband optimization criteria from equation (19) can now be expressed as:

$$\sum_{i=1}^{I}\left[r\frac{dx_i}{dr}\right]e_i^{(j-1)}(k_0) = \sum_{i=1}^{I} x_i(r)p_i^{(j-1)}(k_0), \tag{25}$$

$$j = 1, 2, \ldots, I$$

Expressing equation (25) in matrix-vector form, we get:

$$r\frac{dx}{dr} = Ax, x(r) = \begin{bmatrix} x_1(r) \\ \vdots \\ x_j(r) \end{bmatrix} \text{ and} \tag{26}$$

$$A = E^{-1}P, E_{ij} = e_j^{(i-1)}, P_{ij} = p_j^{(i-1)}, i, j \in \{1, \ldots, I\} \tag{27}$$

where $E_{ij}$ and $P_{ij}$ are the elements of matrices E and P, respectively, in the $i^{th}$ row and $j^{th}$ column and $E^{-1}$ denotes the inverse of matrix E.

The vector differential equation (26) is the master equation that needs to be solved to get the dopant concentrations for an optimum broadband MMF in accordance with this aspect of the invention. The boundary condition for $x(r=a)=x_a$ is arrived at by the choice of the dopant concentrations at the core center and at the core/cladding edge:

$$x_a = X_0 - X_a = \begin{bmatrix} X_1(r=0) \\ \vdots \\ X_I(r=0) \end{bmatrix} - \begin{bmatrix} X_1(r=a) \\ \vdots \\ X_I(r=a) \end{bmatrix} \quad (28)$$

Note that the choice of $X_i(r=0)$ and $X_i(r=a)$ has to be such that the specified numerical aperture requirement (i.e., boundary condition) from equation (22) is satisfied:

$$f(a,k_0) = f_a = (NA \cdot k_0)^2 = \sum_{i=1}^{I} [X_i(r=0) - X_i(r=a)] e_i(k_0) \quad (29)$$

We solve the wideband optimality criteria, equation (26), by diagonalizing matrix A via its eigen-decomposition:

$$A = U\Sigma U^{-1} \quad (30)$$

where $\Sigma$ is a diagonal matrix containing the eigenvalues $\alpha_i$, $i=1, 2, \ldots, I$ of matrix A and U contains the corresponding eigenvectors. It can be shown that the final dopant concentrations at the design wavelength are given by:

$$X(r) = X(r=0) - x(r), \quad (31)$$

$$x(r) = U \begin{bmatrix} (r/a)^{\alpha_1} & 0 & \cdots & 0 \\ 0 & (r/a)^{\alpha_2} & 0 & \vdots \\ \vdots & \vdots & \ddots & 0 \\ 0 & 0 & 0 & (r/a)^{\alpha_I} \end{bmatrix} U^{-1} x_a$$

This invention teaches the existence of "eigenprofiles" defined by $(r/a)^{\alpha_i}$, $i=1, 2, \ldots, I$. These eigenprofiles together with the eigenvectors, which are a function of the material properties of the dopants chosen for the design, along with the boundary conditions (that depend on the numerical aperture) determine the optimum dopant concentration profiles. In the case of a single-dopant fiber, we can only satisfy the zeroeth order optimality criterion and so the resulting dopant concentration would have a parabolic (pure-$\alpha$) profile.

We want the dopant concentration profiles to be bounded implying $\alpha_i \geq 0$. This constraint allows us to arrive at the following necessary condition that any given dopant combination has to satisfy in order for an optimal wideband MMF to exist:

$$A = E^{-1}P \text{ should be a positive semi-definite matrix} \quad (32)$$

where positive semi-definite matrices are defined in any standard text on Linear Algebra such as [11].

Example I

Figure 2A:
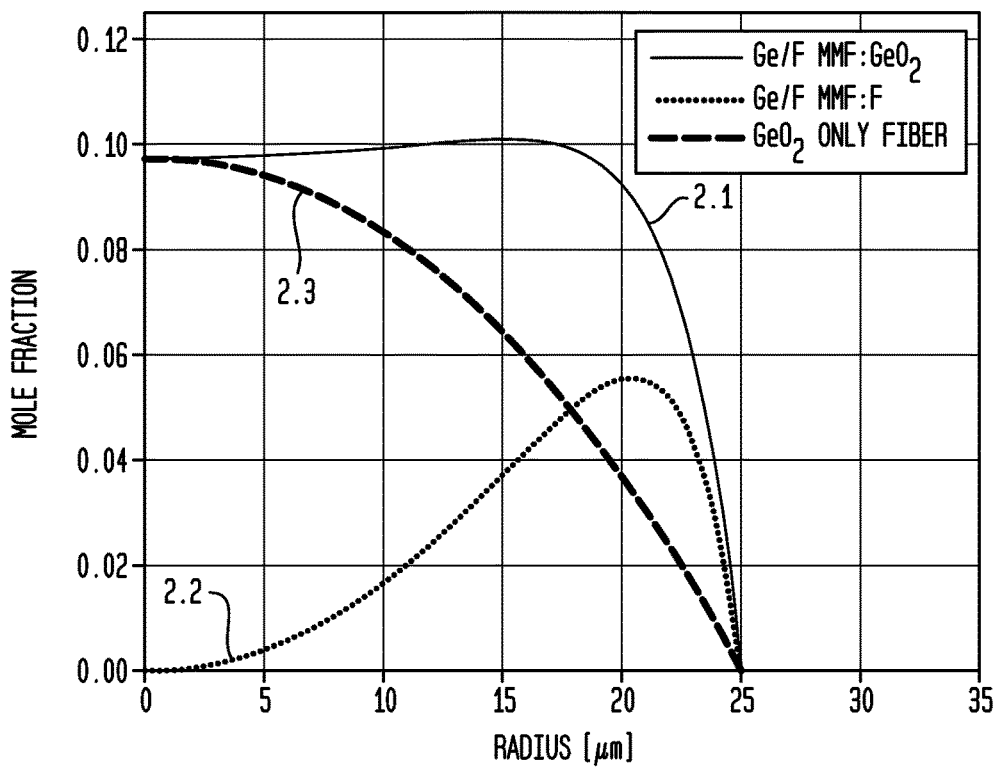
FIG. 2A shows dopant concentration (mole fraction) profiles for an optimum Ge/F MMF design at 850 nm in accordance with one embodiment of the invention.

In one illustrative embodiment of the optimal MMF design, as described above, we choose $GeO_2$ and F as the two dopants. Since we have two dopants, we can control only the zeroeth and first order derivatives of the index profile with respect to wavelength. Thus, we can satisfy only the first two of the wideband optimality criteria, equation (19). The boundary conditions are chosen to be:

$$X_f(r=0)=0, X_f(r=a)=0 \quad (33a)$$

$$X_g(r=a)=0, X_g(r=0)=\text{chosen to satisfy NA requirements} \quad (33b)$$

where the subscript $f$ corresponds to F (fluorine), the subscript $g$ corresponds to $GeO_2$, and NA is the numerical aperture specified at the appropriate design wavelength. The resulting dopant concentrations (in mole fractions) are shown in FIG. 2A. The individual $GeO_2$ concentration profile (curve 2.1) and the individual F concentration profile (curve 2.2) are non-parabolic since they are a linear combination of the eigenprofiles of this wideband MMF.

From equations (11)-(13), it can be concluded that the prior art via the multiple-$\alpha$ profile design approach discussed in [5]-[8] by Olshansky and others will result in a fiber with $GeO_2$ as the only dopant (with no fluorine at all) since we have assumed the fluorine concentration to be zero at both the core center (r=0) and at the core/cladding edge (r=a). FIG. 2A also shows the dopant concentration profile for this $GeO_2$-only fiber. In this case, the $GeO_2$ dopant concentration profile is parabolic (curve 2.3), as expected from our theory.

Figure 2B:
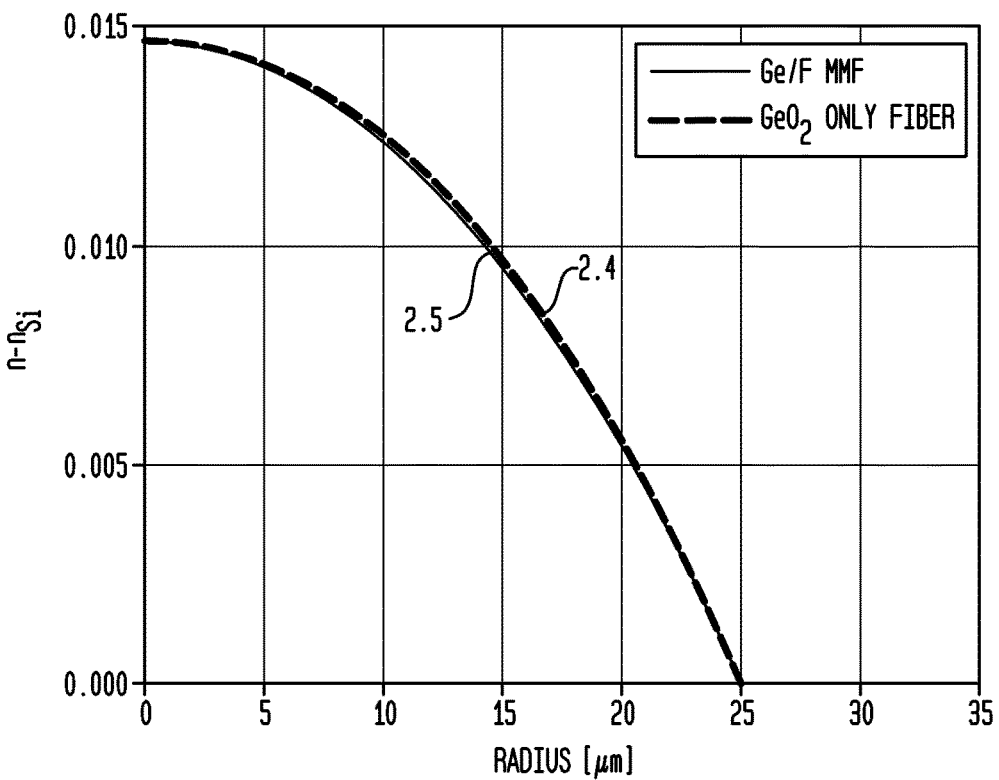
FIG. 2B shows the corresponding composite index profile of the MMF of FIG. 2A; $n_{Si}$ is the refractive index of pure silica at 850 nm.

We also show in FIG. 2B the corresponding refractive index profile $\Delta n(r) = n(r) - n_{Si}$ where $n_{Si}$ is the refractive index of the pure silica at the design wavelength (850 nm in this illustration). For both the optimized Ge/F broadband MMF design in accordance with this embodiment of our invention and the Ge-only MMF design, we get an approximately parabolic index profile (curves 2.4, 2.5).

For the Ge/F MMF design, we can monitor the value of the following metrics derived from the optimality criteria in equation (19):

$$\xi = \frac{r dx_g}{dr} - \frac{p_g}{e_g}x_g + \frac{e_f}{e_g}\frac{r dx_f}{dr} - \frac{p_f}{e_g}x_f \quad (34)$$

$$\xi' = \frac{r dx_g}{dr} - \frac{p_g^{(1)}}{e_g^{(1)}}x_g + \frac{e_f^{(1)}}{e_g^{(1)}}\frac{r dx_f}{dr} - \frac{p_f^{(1)}}{e_g^{(1)}}x_f \quad (35)$$

$$\xi'' = \frac{r dx_g}{dr} - \frac{p_g^{(2)}}{e_g^{(2)}}x_g + \frac{e_f^{(2)}}{e_g^{(2)}}\frac{r dx_f}{dr} - \frac{p_f^{(2)}}{e_g^{(2)}}x_f \quad (36)$$

The corresponding metrics for the $GeO_2$-only fiber are obtained by setting $x_f(r)=0$, $\forall r$.

Figure 3A:
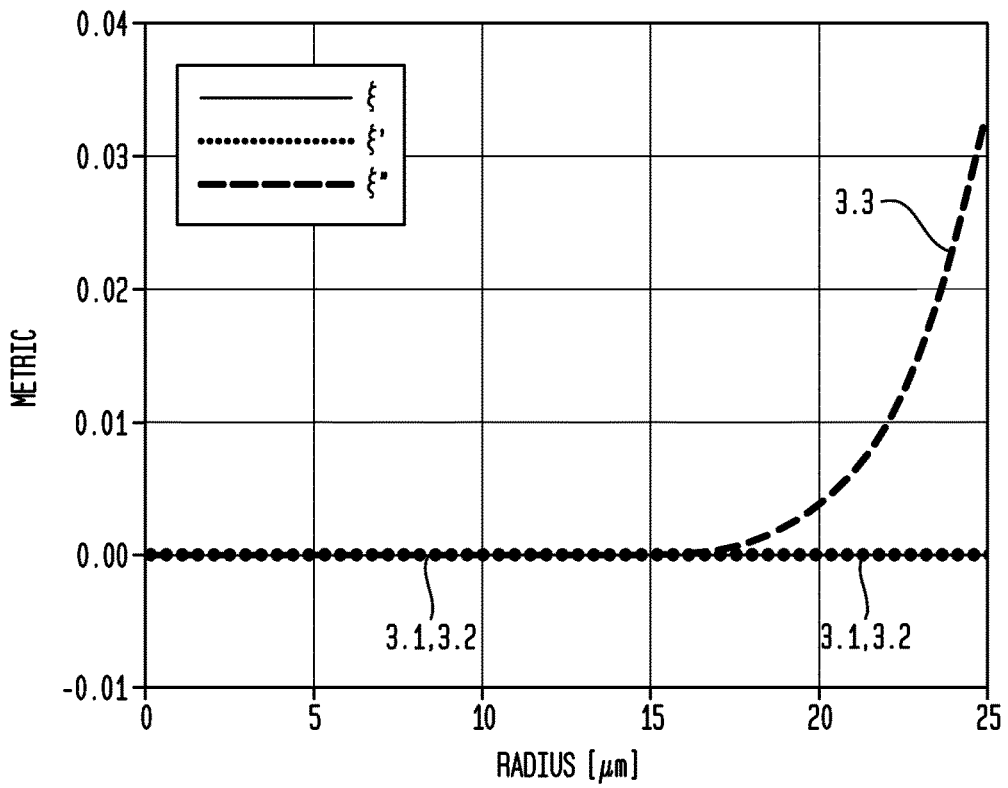
FIGS. 3A & 3B show metrics based on the optimality criteria defined by equation (19)

For the optimum Ge/F broadband MMF design in accordance with the above embodiment of our invention, the first two metrics [$\xi$ and $\xi'$, curves 3.1, 3.2)] are zero for all radii since the zeroeth and first order derivative criteria are exactly satisfied, FIG. 3A. The third metric ($\xi''$, curve 3.3) that is a function of the second order derivative of the index profile with respect to wavelength depends on the material properties and the dopant profiles.

Figure 3B:
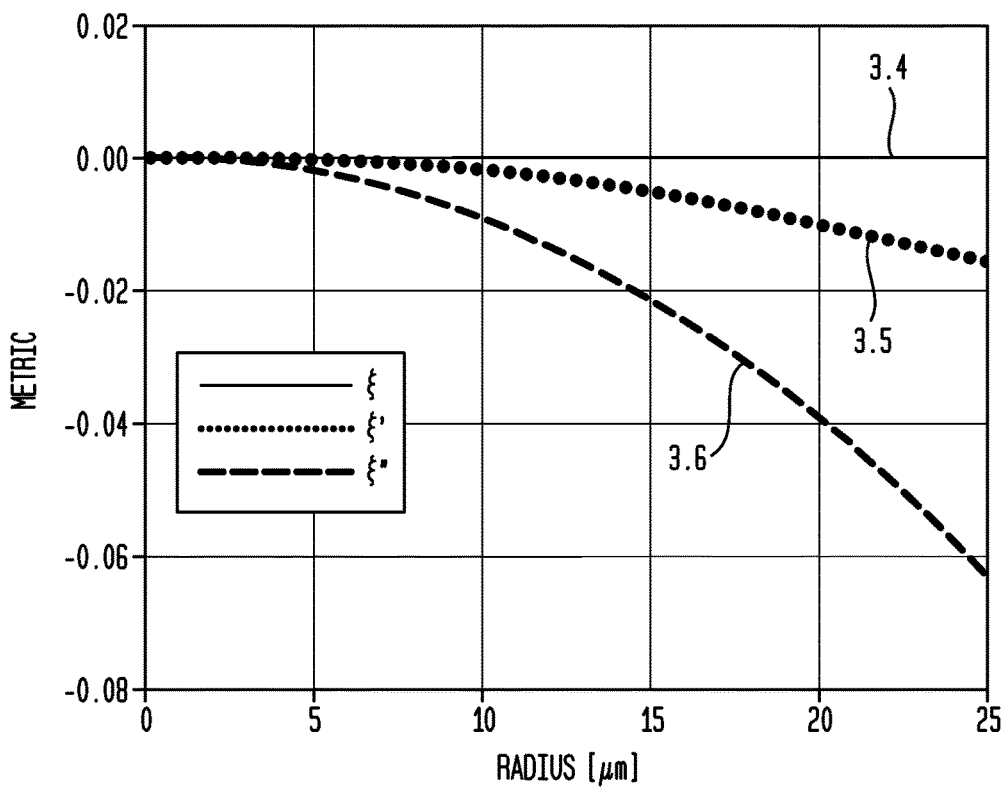

In contrast, for the Ge-only MMF design, FIG. 3B, only the zeroeth order derivative criterion ($\xi$, curve 3.4) is exactly satisfied, whereas the first and second order derivate metrics ($\xi'$ and $\xi''$, curves 3.5, 3.6) solely depend on the resulting profile of the Ge dopant and its material properties and hence are not satisfied.

Figure 4A:
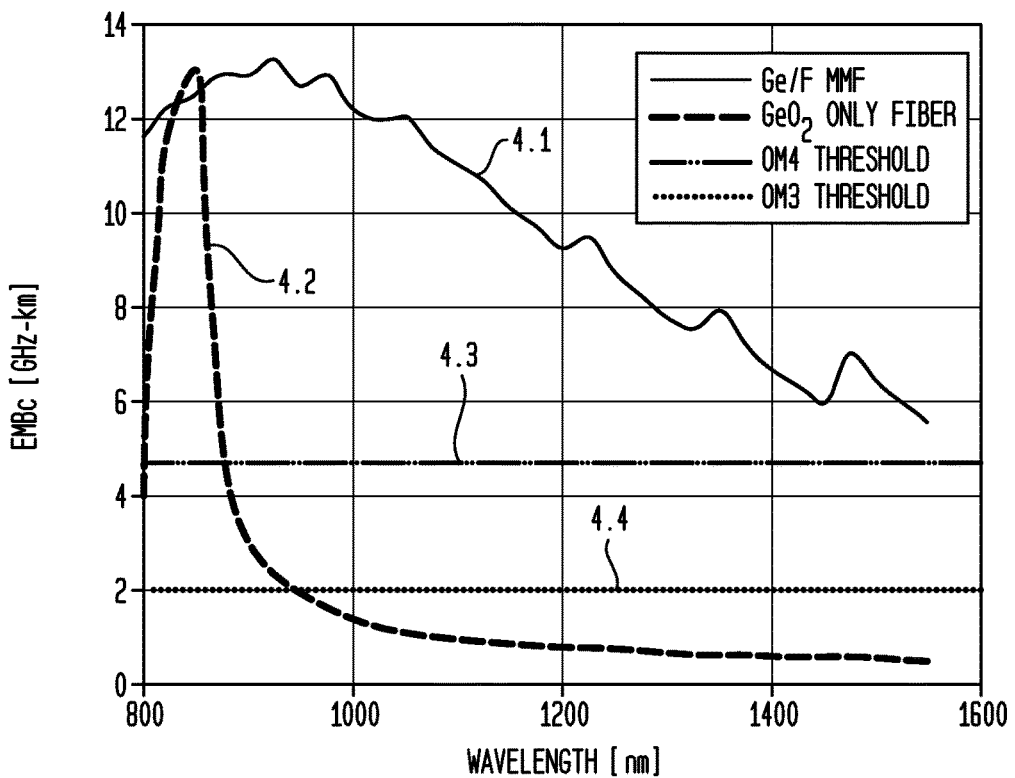
FIG. 4A effective modal bandwidth (EMBc; computed) for both the optimum Ge/F design of FIG. 2A and the Ge-only design. The thresholds for OM4 and OM3 compliance are also shown for reference.

For each fiber design, we numerically estimate the mode shapes and the corresponding group delays via a mode solver. (Mode solvers are well known in the art; moreover, they are commercially available.) We further compute the effective modal bandwidth (EMBc) for both designs (curves 4.1, 4.2, FIG. 4A). The OM4 specification for multimode fiber requires a minimum EMBc=4.7 GHz-km (line 4.3), whereas for OM3 we require a minimum EMBc=2.0 GHz-km (line 4.4). The optimized Ge/F broadband MMF design in accordance with this embodiment of our invention is OM4 compliant over the 800-1550 nm and hence is a truly wideband fiber. On the other hand, the Ge-only fiber (curve 4.2) is OM4 compliant over only 800-875 nm and OM3 compliant over only 800-950 nm. Thus, through optimum dopant profile design in the Ge/F embodiment of our invention, we have achieved true wideband performance over a 750 nm window with just two dopants—unlike any of the results reported in the prior art discussed previously.

Figure 4B:
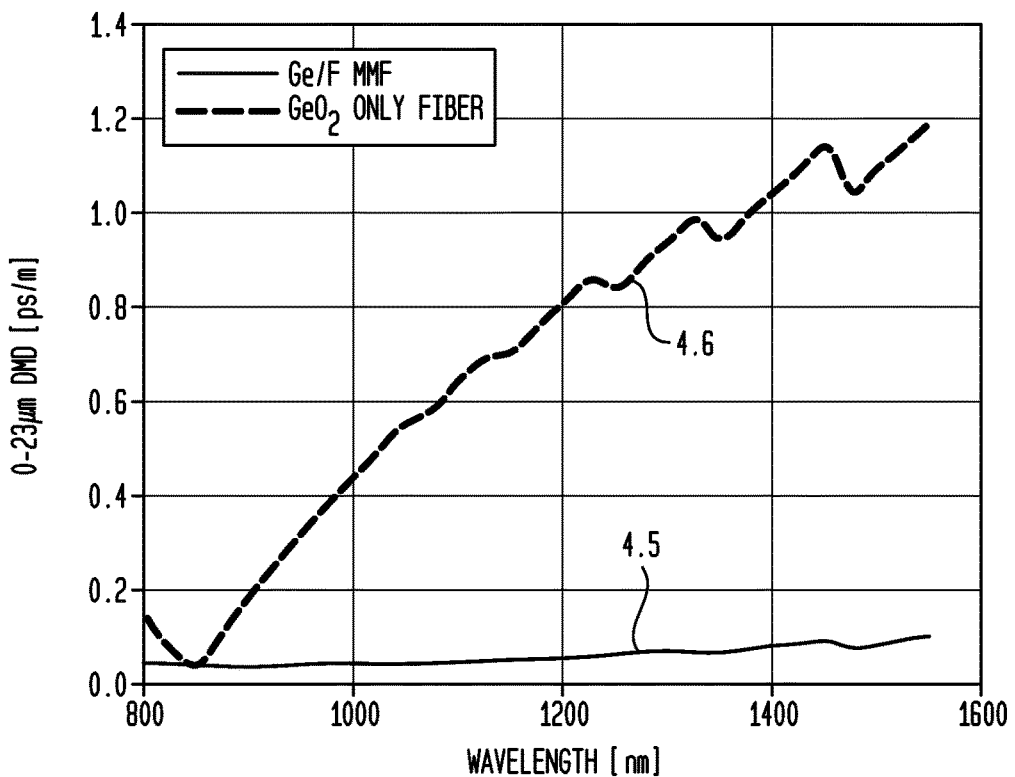
FIG. 4B shows the outer DMD for both designs of FIG. 4A.

The effective modal bandwidth (EMBc) is obtained by estimating the differential modal delay (DMD) traces with single-mode launch at different radial offsets across the face of the fiber core. The DMD across various radial offsets is also used to characterize the performance of MMFs. The outer DMD mask results, defined by the worst-case DMD across the 0-23 μm radial offsets, is shown for both fiber designs, FIG. 4B. As expected, our optimized Ge/F broadband MMF design has an almost flat DMD over the 800-1550 nm window (curve 4.5) compared to the Ge-only design (curve 4.6), which increases dramatically over the same window.

Designing Near-Optimal Broadband MMFs

For certain dopant combinations, the eigenvalues $\alpha_i$ of matrix A can be negative, thereby implying that the corresponding eigenprofile has a singularity at r=0. Therefore, the corresponding fiber design would not be practical. Sometimes the optimum dopant profile may require concentrations beyond certain limits imposed by manufacturability issues. In all such cases, it is not possible to satisfy all the I different optimality criteria in equation (19). Under such circumstances, this invention further contemplates a systematic framework to arrive at near-optimal MMF designs.

We describe an optimization framework where the following metric:

$$\xi = \sum_{j=2}^{I} w_j \left\| \sum_{i=1}^{I} \left[ r \frac{dx_i}{dr} \right] e_i^{(j-1)}(k_0) = \sum_{i=1}^{I} x_i(r) p_i^{(j-1)}(k_0) \right\|^2 \quad (35)$$

is minimized subject to the following equality criteria:

$$\sum_{i=1}^{I} \left[ r \frac{dx_i}{dr} \right] e_i^{(0)}(k_0) = \sum_{i=1}^{I} x_i(r) p_i^{(0)}(k_0) \quad (36)$$

$$x_i(r) = \text{pre-specified for some } r \in [0, a] \quad (37)$$

and subject to the following inequality constraints:

$$x_{i,min} \leq x_i(r) \leq x_{i,max} \quad (38)$$

$$x_{i,min} = X_i(r=0) - X_{i,max}, x_{i,max} = X_i(r=0) \quad (39)$$

where $\|\cdot\|^2$ is the $L_2$-norm [11] and $w_j$ is the weight of the $j^{th}$ order derivative. The equality criterion (36) is nothing but the zeroeth derivative criteria from equation (19). The first and higher order derivative criteria from equation (19) are encapsulated by the metric ξ in equation (35). The equality criterion (37) allows for the fiber design to have specific values in some sub-intervals of the fiber radius. For example, these could take the form of one or more "flat-zones" (radial zones of relatively constant dopant concentration) interspersed along the fiber radius to account for manufacturing and process issues. [Flat-zone, broadband MMFs are described in co-pending application Ser. No. 14/725,315 (Balemarthy et al. 3-2-9-66) entitled "Broadband Multi-Mode Optical Fibers with Flat-Zone in Dopant Concentration Profile" and concurrently filed herewith.] Finally, the inequality constraints ensure that the dopant concentration profiles generated by the above optimization process will satisfy manufacturability constraints.

The weights $w_j$ are chosen to have different amounts of emphasis over the various derivative criteria. For example, a three-dopant MMF design, with $w_1=1$, $w_2=1$ would equally emphasize both the first and second derivative of the dopant profiles. On the other hand, with $w_1=1$, $w_2=0.5$, the emphasis on the second derivative performance is half that of the first derivative performance. As a consequence, by judiciously varying the weights $w_j$, we can arrive at different families of MMF designs that will trade-off manufacturability and wideband performance.

The design framework proposed in equations (35-39) can readily be numerically solved to arrive at different wideband MMF designs. By numerically solved we simply mean that the calculations can be performed on a computer using suitable numerical codes (software programs).

Example II

In one illustrative embodiment of the above fiber designs, we choose $GeO_2$, P and F as the three dopants. The boundary conditions for these dopants are chosen to be:

$$X_f(r=0)=0, X_f(r=a)=0 \quad (40a)$$

$$X_p(r=0)=0.03 \text{(mole fraction)}, X_p(r=a)=0 \quad (40b)$$

$$X_g(r=a)=0, X_g(r=0)=\text{chosen to satisfy } NA \text{ requirements} \quad (40c)$$

where the subscript $f$ corresponds to F (fluorine), the subscript p corresponds to P (phosphorus) and the subscript g corresponds to $GeO_2$, and NA is the numerical aperture specified at the appropriate design wavelength. For illustrative purposes, we further constrain the maximum allowable P concentration to be 3% mole and the maximum F concentration to be 3.5% mole. The minimum allowed concentration for all three dopants is 0% mole. The weights in the optimization metric ξ, equation (35), are chosen to be $w_1=w_2=1$.

Figure 5A:
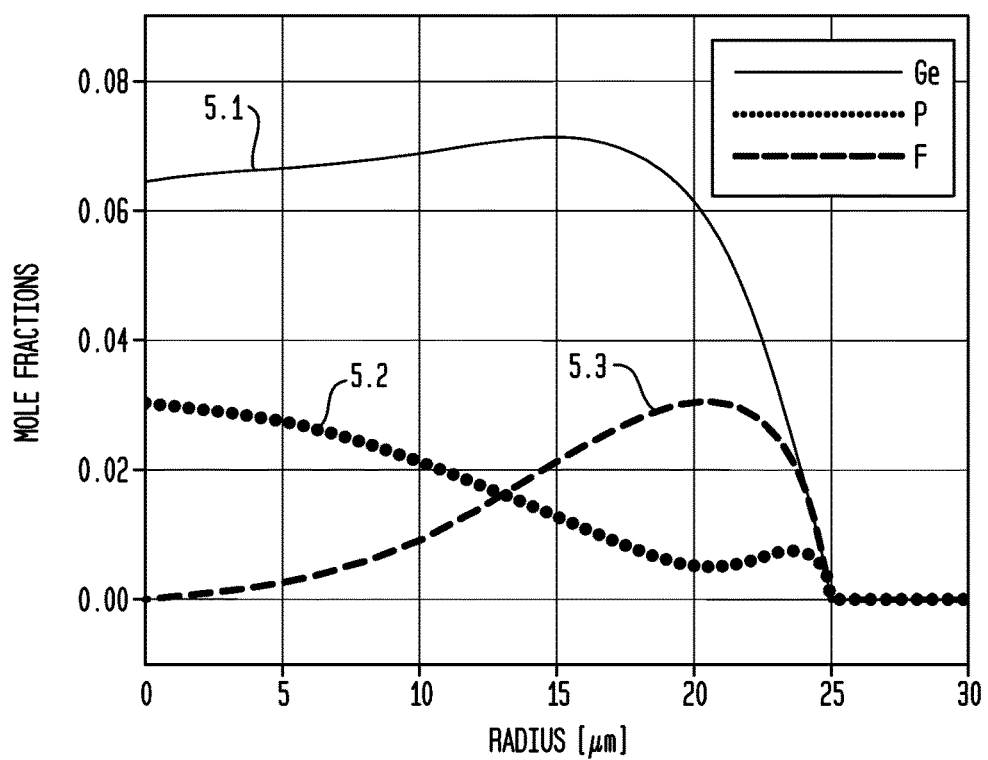
FIG. 5A shows dopant concentration (mole fraction) profiles for a Ge/P/F MMF design optimized in accordance with another embodiment of the invention, per equations (35-39) at 850 nm.
Figure 5B:
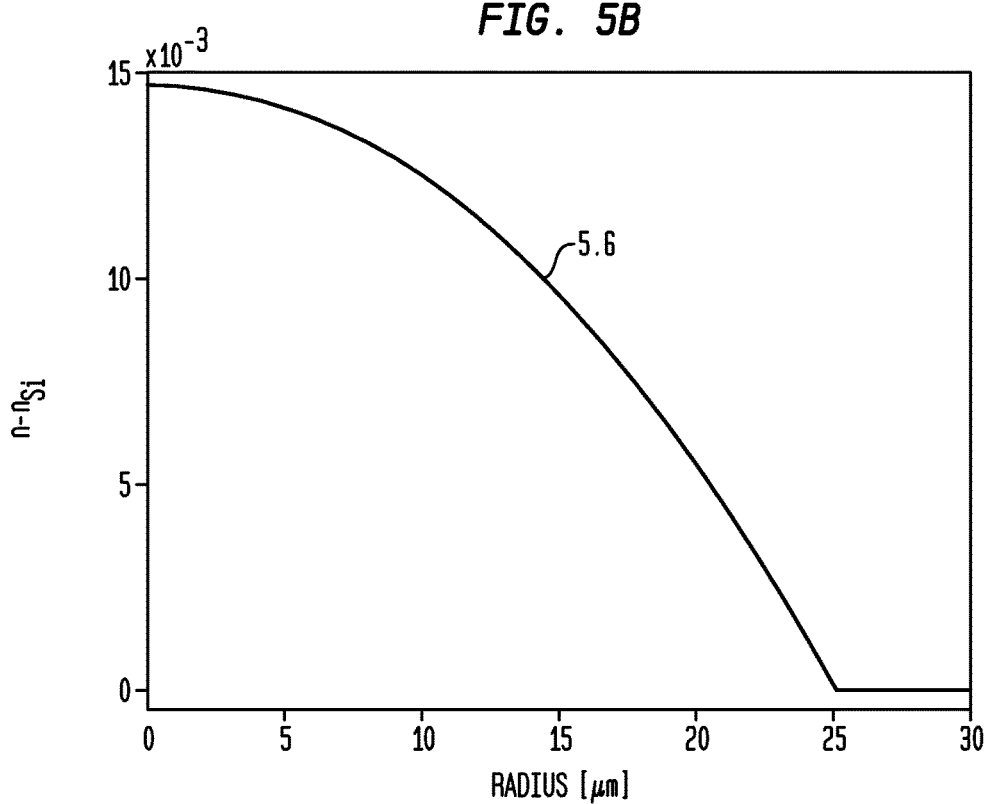
FIG. 5B shows the index profile (i.e., the difference $\Delta n=n-n_{Si}$, where $n_{Si}$ is the refractive index of pure silica at 850 nm) corresponding to the Ge/P/F MMF optimum design of FIG. 5A.
Figure 5C:
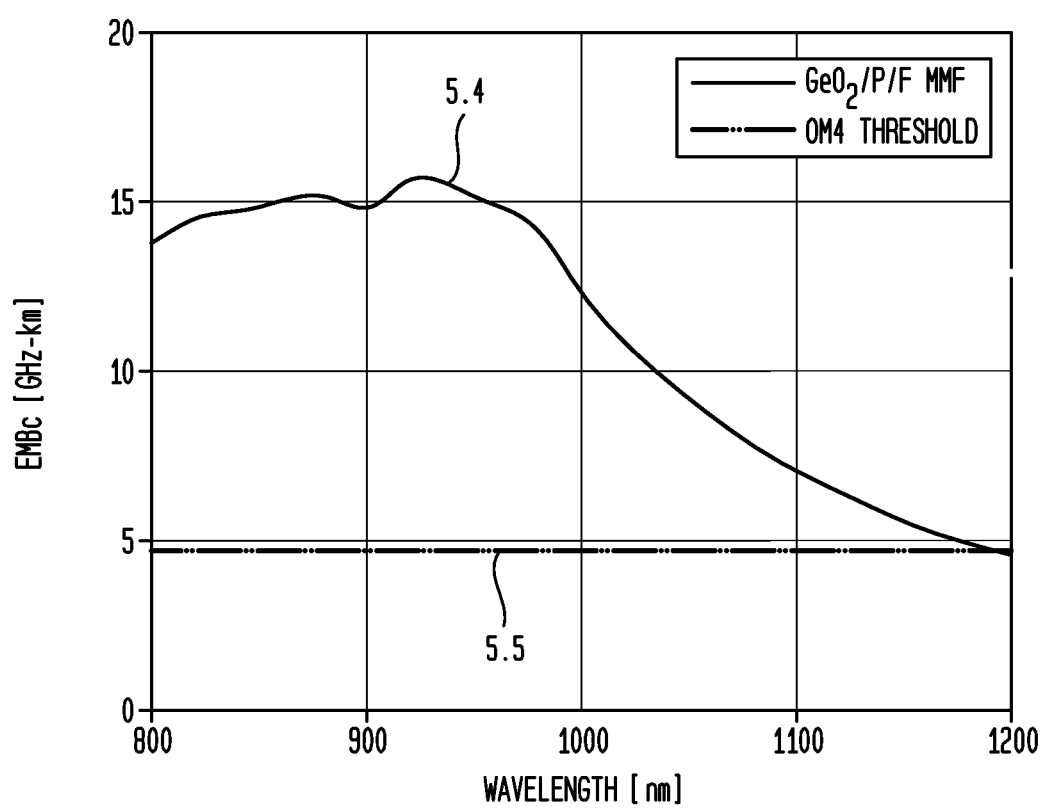
FIG. 5C shows the effective modal bandwidth (EMBc; computed) corresponding to the Ge/P/F MMF optimum design of FIG. 5A. The threshold for OM4 compliance is shown for reference.

Using the fiber design technique described by equations (35-39) at 850 nm, the resulting dopant concentration profiles (in mole fractions; FIG. 5A; curves 5.1, 5.2 and 5.3 for Ge, P and F, respectively) and the corresponding variation of EMBc with wavelength (FIG. 5C; curve 5.4) are shown. FIG. 5B also shows the threshold for OM4 compliance (line 5.5). Clearly, the OM4 compliance window (described earlier) for this fiber is greater than 400 nm. In addition, for completeness we show the composite index profile 5.6 in FIG. 5C; that is, the profile resulting from the combination of dopant concentration profiles 5.1, 5.2 and 5.3 shown in FIG. 5A. Index profile 5.6 is essentially parabolic.

Example III

Figure 6A:
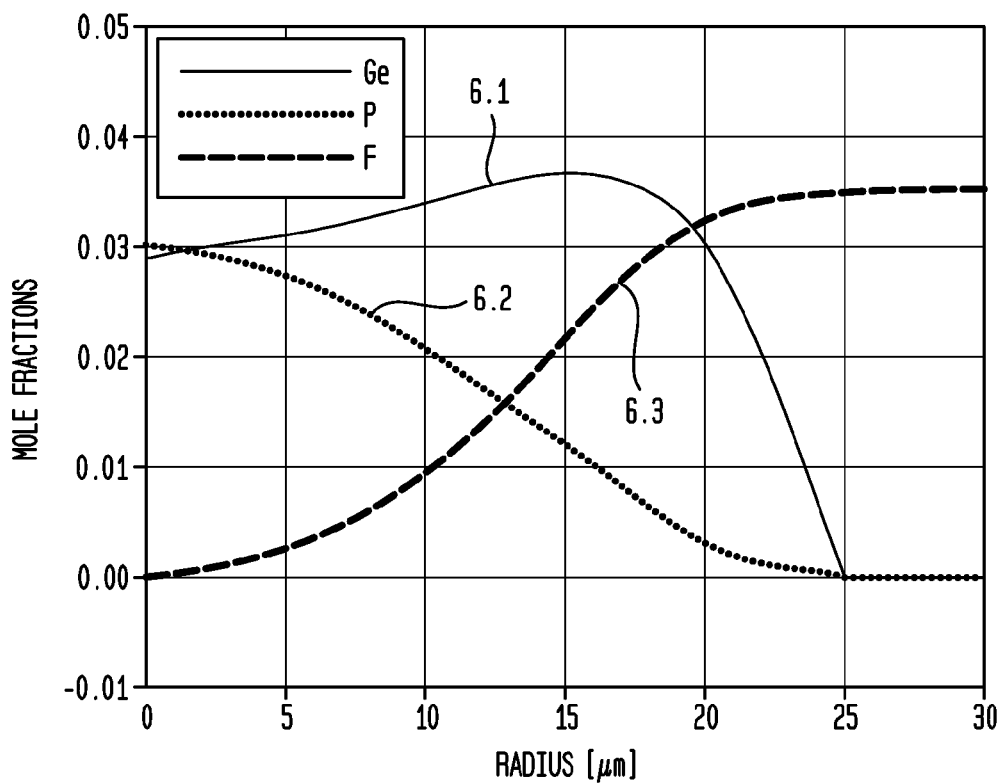
FIG. 6A shows dopant concentration (mole fraction) profiles for a down-doped Ge/P/F MMF design optimized in accordance with yet another embodiment of the invention, per equations (35-39) at 850 nm.
Figure 6B:
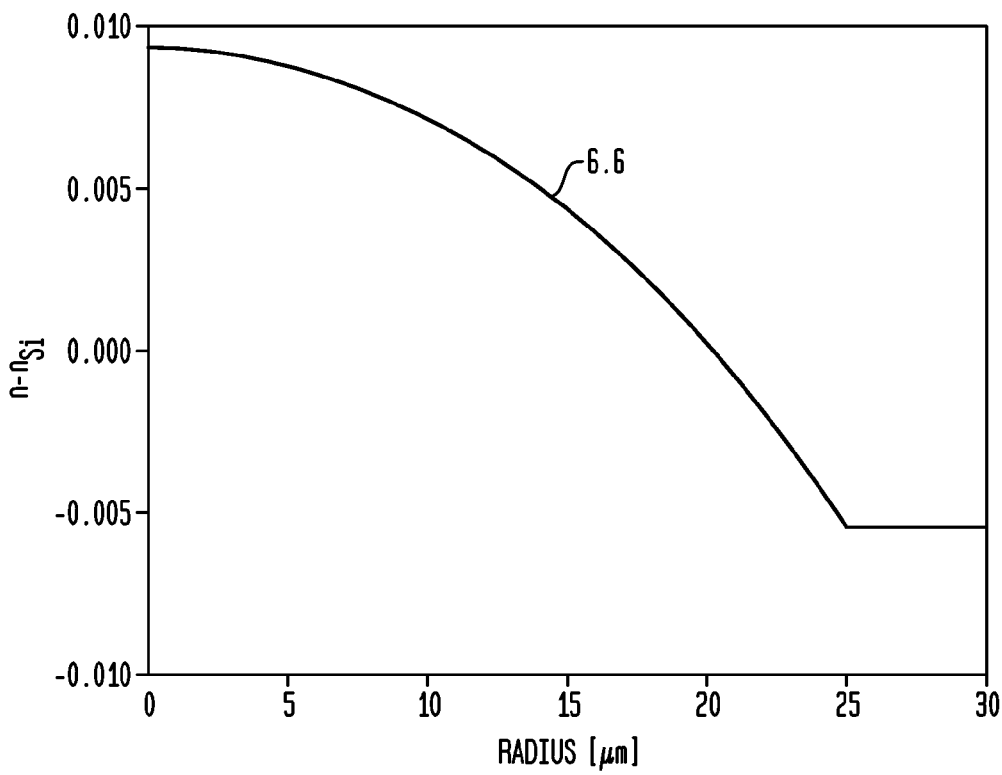
FIG. 6B shows the index profile (i.e., the difference $\Delta n=n-n_{Si}$, where $n_{Si}$ is the refractive index of pure silica at 850 nm) corresponding to the Ge/P/F MMF optimum design of FIG. 6A.

This invention is applicable to the design of broadband, down-doped MMF (e.g., FIG. 1B) as well. In this illustrative embodiment, the design parameters are all the same as in example II except for the down-doping in the cladding, which is achieved by F-doping the cladding, in this case). Using the fiber design technique described by equations (35-39), the resulting dopant concentrations (in mole fractions; FIG. 6A; curves 6.1, 6.2 and 6.3 for Ge, P and F, respectively) and the corresponding variation of EMBc with wavelength (FIG. 6C; curve 6.4) are shown. FIG. 5B also shows the threshold for OM4 compliance (line 6.5). Clearly, the OM4 compliance window (described earlier) for this fiber is greater than 350 nm. In addition, for completeness we show the composite index profile 6.6 in FIG. 6C; that is, the index profile resulting from the combination of dopant concentration profiles 6.1, 6.2 and 6.3 shown in FIG. 6A. Index profile 6.6 is essentially parabolic.

Manufacturing/Fabrication Process

Various design and performance characteristics are typically known a priori, and these are provided as inputs to a computer (or computer system). Illustrative performance characteristic inputs include either (or both) effective mode bandwidth (EMBc) and differential modal delay (DMD). Design inputs include the numerical aperture (NA) and the bandwidth for the particular application of the MMF. Other design inputs include dopant data associated with doping various regions of the fiber, that is, the kind of dopant (e.g., Ge, P, Al, B and/or their oxides, as well as F), the relationship between the refractive index and the dopant, and the region to be doped (e.g., the core, trench, inner cladding and/or outer cladding regions). Finally, any structural features (e.g., a cladding feature such as a trench) are also inputted to the computer, which processes all these inputs in accordance with equations (15)-(39), as described previously.

The output of the computer computation is a set of dopant concentration profiles (one profile for each dopant inputted to the computer). These profiles serve as inputs to a controller, which in turn controls a deposition system (e.g., an MCVD system); that is, a multiplicity of glass layers are deposited on a suitable substrate, and each of these layers is doped (or not doped) in accordance with dopant profiles to produce a MMF preform. Illustratively, the glass layers are deposited by MCVD inside an undoped glass substrate tube. The as-deposited tube is then collapsed to form a solid core rod. Then, the core rod is further overclad by placing the core rod inside another overclad tube. Heat and vacuum are used to fuse the core rod and the overclad tube together to form a larger preform. Illustratively, both the substrate tube and the overclad tube have the same index.

Alternatively, the overclad process can also be performed simultaneously with the fiber drawing process. In the overclad-during-draw (ODD) process, the core rod is placed inside an overclad tube, and both are fused together as they are drawn into a fiber.

In the case of ODD of bend-insensitive fiber, the core rod is placed inside an F-doped inner tube and another undoped silica outer jacket tube. After fiber draw, the Ge—P—F core is located inside the undoped silica [substrate] cladding, which is surrounded by the F-doped inner cladding and then the undoped outer cladding. The F-doped inner tube has a lower refractive index than both the substrate and the outer jacket tubes.

In any case, the preform may be an intermediate product in and of itself, or it may serve as the "input" to a draw tower, which in standard fashion draws the preform into a MMF.

Design Procedure

The design process programmed into the computer follows, in general, the step-by-step procedure described below. Although the procedure describes the design of a MMF having a down-doped cladding region 10.4 (FIG. 1B), it is equally applicable in principle to the design of other MMFs, such as those having an up-doped outer cladding region, or an undoped outer cladding region, or a trench region.

Optimum, Broadband MMF Design Procedure

STEP 1: The following quantities are known a priori:

a. The design wavelength $\lambda_d$ at which the fiber numerical aperture $NA = \sqrt{n_{core}^2 - n_{clad}^2}$ is specified where $n_{core}$ and $n_{clad}$ are the refractive indices of the core region at the fiber axis 10.5 (FIGS. 1A & 1B) and at the core-cladding interface 10.6, respectively.

b. The cladding index difference is given as $\Delta n_{clad} = n_{clad} - n_S$ where $n_{clad}$ is the refractive index of the cladding region and $n_s$ is the refractive index of pure silica at the wavelength $\lambda_d$. Note, $n_{clad}$ can be higher or lower than $n_s$, or equal to it.

c. Assume that the square of the refractive index is proportional to the dopant concentration; i.e., $$X_i = \frac{n_i^2(\lambda_d) - n_s^2(\lambda_d)}{n_{i_R}^2(\lambda_d) - n_s^2(\lambda_d)} = \frac{z_i(\lambda_d) - z_s(\lambda_d)}{e_i(\lambda_d)}; \quad (41)$$

$$e_i = z_{i_R}(\lambda_d) - z_s(\lambda_d)$$

where $X_i$ is the $i^{th}$ dopant's concentration expressed in mole fractions, $n_{i_R}(\lambda_d)$ is the refractive index with only the dopant (no silica) and $n_i(\lambda_d)$ is the desired refractive index after doping pure silica with this particular dopant. Similarly, $z_{i_R}(\lambda_d)$ is z with only the dopant (no silica), $z_i(\lambda_d)$ is the desired z after doping pure silica with this particular dopant, and $z_S(\lambda_d)$ is z of pure silica. However, when the square of the refractive index is not strictly proportional to the dopant concentration, one can still use this methodology to calculate the required refractive index induced by a given dopant and then calculate the required dopant concentration based on experimental data.

d. Choose the concentrations of all the dopants except $GeO_2$ on the fiber axis. Well known maximum limits based on manufacturability are used to estimate these dopant concentrations. Later the design will be iterated over different values of these dopant concentrations.

e. Choose the parameter p in the range $0.0 < \mu \leq 1.0$ corresponding to differing amounts of control on the group delay spread. Illustratively, in the case of Marcatili $\mu \approx 0.5$, where the worst-case group delay spread at $k_0$ is minimized, and in the case of Olshansky $\mu \approx 0.6$, where the RMS pulse-width is minimized.

STEP 2: Determine the dopant concentrations at the fiber axis and within the cladding region:

a. From $\Delta n_{clad}$, determine the fluorine concentration in the cladding region, $x_{f,clad}$, as follows:

$$n_{clad} = \Delta n_{clad} + n_s \quad (42)$$

$$X_{f,clad} = \frac{z_{clad}(\lambda_d) - z_s(\lambda_d)}{e_f} \quad (43)$$

b. From the numerical aperture NA, determine the $GeO_2$ concentration on the fiber axis, $X_g(r=0)$ as follows:

$$X_g(r=0) = \frac{(NA \cdot k_0)^2 - \sum_{i \neq Ge} x_i(r=a)e_i(k_0)}{e_g} + X_g(r=a) \quad (44)$$

c. Compute the boundary condition vector for the I dopants (including $GeO_2$):

$$x_a = X_0 - X_a = \begin{bmatrix} X_1(r=0) \\ \vdots \\ X_I(r=0) \end{bmatrix} - \begin{bmatrix} X_1(r=a) \\ \vdots \\ X_I(r=a) \end{bmatrix}. \quad (45)$$

STEP 3: Compute the intermediate parameters d and $p_i$, i=1, ..., I (I=number of dopants)

$$d = \frac{(2-\mu)z_0 + \mu z_s}{z_0^{(1)}}, z_0 = z_s + \sum_{i=1}^{I} X_i(r=0)e_i(k_0) \quad (45)$$

$$p_i(k_0) = 2de_i^{(1)} - 2e_i \quad (46)$$

STEP 4: Compute the eigenprofiles of matrix A for the dopants chosen from:

$$A = E^{-1}P, E_{ij} = e_j^{(i-1)}, P_{ij} = p_j^{(i-1)}, i,j \in \{1, \ldots, I\} \quad (47)$$

where $E_{ij}$ and $P_{ij}$ are the elements of matrices E and P, respectively, in the $i^{th}$ row and $j^{th}$ column and $E^{-1}$ denotes the inverse of matrix E. This is done by diagonalizing matrix A via its eigen-decomposition:

$$A = U\Sigma U^{-1} \quad (48)$$

where $\Sigma$ is a diagonal matrix containing the eigenvalues $\alpha_i$, i=1, 2, ..., I of matrix A and U contains the corresponding eigenvectors.

STEP 5: The final dopant concentration profiles are computed as follows:

$$X(r) = X(r=0) - x(r), \quad (49)$$

$$x(r) = U \begin{bmatrix} (r/a)^{\alpha_1} & 0 & \cdots & 0 \\ 0 & (r/a)^{\alpha_2} & 0 & \vdots \\ \vdots & \vdots & \ddots & 0 \\ 0 & 0 & 0 & (r/a)^{\alpha_I} \end{bmatrix} U^{-1} x_a$$

A valid solution exists if and only if the matrix A is positive semi-definite. If this condition is not satisfied, change the dopant combination and repeat the design process.

Near-Optimum, Broadband MMF Design Procedure

STEP 1: Follow STEPS 1-3 of the "Optimum, Broadband MMF Design Procedure" described above.

STEP 2: For an I-dopant MMF design, choose the 1-1 weights $w_j$. The most straight-forward choice is $w_j=1$. The design can be iterated over these weights, if required.

STEP 3: Choose the inequality and equality constraints for various dopants based on manufacturability issues:

$$x_{i,min} \leq x_i(r) \leq x_{i,max} \quad (50)$$

$$x_{i,min} = X_i(r=0) - X_{i,max}, x_{i,max} = X_i(r=0) \quad (51)$$

$$x_i(r) = \text{pre-specified for some } r \in [0,a] \quad (52)$$

STEP 3: Set-up and execute numerical code to minimize:

$$\xi = \sum_{j=2}^{J} w_j \left\| \sum_{i=1}^{I} \left[ r\frac{dx_i}{dr} \right] e_i^{(j-1)}(k_0) - \sum_{i=1}^{I} x_i(r) p_i^{(j-1)}(k_0) \right\|^2 \quad (53)$$

where $\|\cdot\|^2$ is the $L_2$-norm for the given boundary condition $x_a$ subject to the following equality criteria:

$$\sum_{i=1}^{I} \left[ r\frac{dx_i}{dr} \right] e_i^{(0)}(k_0) = \sum_{i=1}^{I} x_i(r) p_i^{(0)}(k_0) \quad (54)$$

$$x_i(r) = \text{pre-specified for some } r \in [0,a] \quad (55)$$

and subject to the following inequality constraints:

$$x_{i,min} \leq x_i(r) \leq x_{i,max} \quad (56)$$

$$x_{i,min} = X_i(r=0) - X_{i,max}, x_{i,max} = X_i(r=0) \quad (57)$$

STEP 4: The final dopant concentrations are given by $X_i(r) = X_i(r=0) - x_1(r)$.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention. In particular, the design framework of the present invention may also be applied to co-doped, few-moded optical fibers for potential use in WDM or DWDM (dense WDM) long-haul systems. In addition, we note that while only a few illustrative embodiments of the invention have been provided, all MMFs that are optimized as per either equation (19) or equations (35-39) are embraced by this invention.

What is claimed is:

1. A broadband multimode optical fiber comprising:
   a core region having a transverse cross-section and a longitudinal axis, said core region being configured for broadband operation at wavelengths $\lambda$ within a predetermined wavelength range, $\Lambda$, and
   a cladding region surrounding said core region,
   said core and cladding regions being configured to support the propagation of optical radiation in said core region and along said axis simultaneously in a plurality of transverse modes,
   said core region having a refractive index profile $n(r,\lambda)$ and being co-doped with I different dopants having concentration profiles $X_i(r)$, i=1, 2, ... I, the concentrations and distributions of said dopants being radially varied within said transverse cross-section of said core region so that the refractive index of said core region is radially graded and so that variations in $z(r,\lambda)$ with respect to wavelength are reduced, where
   $$z(r,\lambda) \triangleq n^2(r,\lambda)k_0^2,$$
   r is radius, $\lambda$ is the wavelength of said optical radiation, n is the refractive index of said core region, $$k_0 = \frac{2\pi}{\lambda}$$

is the wave number, and wherein said concentrations and distribution of said dopants are also radially varied within said transverse cross-section of said core region so that said dopant concentration profiles are configured by the following criteria:
- (a) a profile function $f(r,\lambda)$ is defined by $f(r,\lambda)=z_0-z(r,\lambda)$, $z_0=z(r=0,\lambda)$,
- (b) $f(r=0,\lambda)=f_0=0$, $f(r=a,\lambda)=f_a=(NA \cdot k_0)^2$, where NA is the numerical aperture of the fiber and equation (b) satisfies equation (c) below, $$f^{(i-1)} + \frac{r}{2}\frac{\partial f^{(i-1)}}{\partial r} = [df^{(1)}]^{(i-1)}, i = 1, 2, \ldots, I, \quad (c)$$

where the $i^{th}$ order derivative of a quantity x with respect to $k_0$ is denoted by $$x^{(i)} = \frac{\partial^i x}{\partial k_0^i}$$

and the parameter d is given by $$d = \frac{Dz_0}{z_0^{(1)}};$$

and
- (d) said profile function $f(r,\lambda)$ is related to said dopant concentration profiles $X_i(r)$, $i=1, 2, \ldots, I$ by $$f(r, k_0) = \sum_{i=1}^{I} x_i(r)e_i(k_0), \quad x_i(r) = X_i(r=0) - X_i(r)$$

with $e_i(k_0) = z_{i_R}(k_0) - z_S(k_0)$ where $z_{i_R}(k_0)$ is the z due to a reference amount of dopant concentration for dopant i and $z_S$ is the z due to pure silica.

2. The fiber of claim 1, wherein
- (e) said profile function $f(r,\lambda)$ is related to said dopant concentration profiles $X_i(r)$, $i=1, 2, \ldots, I$ by $$f(r, k_0) = \sum_{i=1}^{I} x_i(r)e_i(k_0), \quad x_i(r) = X_i(r=0) - X_i(r),$$

- (f) said dopant concentration profiles $X_i(r)$ minimize the metric $\xi$ given by:

$$\xi = \sum_{j=2}^{I} w_j \left\| \sum_{i=1}^{I} \left[r\frac{dx_i}{dr}\right]e_i^{(j-1)}(k_0) - \sum_{i=1}^{I} x_i(r)p_i^{(j-1)}(k_0) \right\|^2$$

where $\|\cdot\|^{T2}$ is the $L_2$-norm, with $e_i(k_0)=z_{i_R}(k_0)-z_S(k_0)$ where $z_{i_R}(k_0)$ is the z due to a reference amount of dopant concentration for dopant i and $z_S$ is the z due to pure silica; $p_i(k_a)=2de_i^{(1)}-2e_i$ and $w_j$ is the weight on the $j^{th}$ order derivative of said profile function $f(r,\lambda)$; Note that the $i^{th}$ order derivative of a quantity x with respect to $k_0$ is denoted by $$x^{(i)} = \frac{\partial^i x}{\partial k_0^i}$$

- (g) said minimization is subject to the following equality criteria:

$$\sum_{i=1}^{I}\left[r\frac{dx_i}{dr}\right]e_i^{(0)}(k_0) = \sum_{i=1}^{I} x_i(r)p_i^{(0)}(k_0),$$

where $x_i(r)$ is pre-specified for some $r \in [0,\alpha]$, $p_i^{(0)}$ and $e_i^{(0)}$ are the zeroeth order derivatives of matrix elements e and p, and

- (h) said minimization is also subject to the following inequality constraints:

$x_{i,min} \leq x_i(r) \leq x_{i,max}$, where $x_{i,min}=X_i(r=0)-X_{i,max}, x_{i,max}=X_i(r=0)$.

3. The fiber of claim 1, wherein said multimode fiber is suitable for use in a CWDM system.

4. A method of fabricating an optimum broadband multimode optical fiber comprising the steps of:
- (a) determining desired performance characteristics of the fiber, including at least a core region and a cladding region surrounding said core region, said core region having a refractive index $n(r,\lambda)$,
- (b) determining desired structural characteristics of the fiber,
- (c) determining the numerical aperture and bandwidth of the fiber,
- (d) determining I different dopants that will be incorporated into the core region of the fiber, each of said dopants being, characterized by a dopant concentration profile,
- (e) setting up a numerical code to generate the dopant concentration profiles of each of said dopants by reducing the variation of $z(r,\lambda)$ with respect to wavelength, where $z(r,\lambda) \triangleq n^2(r,\lambda)k_0^2$, r is radius, $\lambda$ is wavelength, and $$k_0 = \frac{2\pi}{\lambda}$$

is the wave number,
- (f) setting up a numerical code to generate a profile function $f(r,\lambda)$ defined by $f(r,\lambda)=z_0-z(r,\lambda)$, $z_0=z(r=0,\lambda)$ and $f(r=0,\lambda)=f_0=0$, $f(r=a,\lambda)=f_a=(NA\cdot k_0)^2$, where NA is the numerical aperture of the MMF and r=a is radius of said core region, said profile function satisfying equation (g) below,
- (g) setting up a numerical code to generate $$f^{(i-1)} + \frac{r}{2}\frac{\partial f^{(i-1)}}{\partial r} = [df^{(1)}]^{(i-1)}, i = 1, 2, \ldots, I,$$

where the $i^{th}$ order derivative of a quantity x with respect to $k_0$ is denoted by $$x^{(i)} = \frac{\partial^i x}{\partial k_0^i}$$

and the parameter d is given by $$d = \frac{Dz_0}{z_0^{(1)}};$$

said profile function $f(r,\lambda)$ being related to said dopant concentrations $X_i(r)$, i=1, 2, ..., I by $$f(r, k_0) = \sum_{i=1}^{I} x_i(r)e_i(k_0), \ x_i(r) = X_i(r=0) - X_i(r),$$

with $e_i(k_0) = z_{i_R}(k_0) - z_S(k_0)$ where $z_{i_R}(k_0)$ is the z due to a reference amount of dopant concentration for dopant l and $z_S$ is the z due to pure silica, (h) providing the dopant concentration profiles as inputs to a deposition system that produces an optical fiber preform in which the concentration of each dopant in its core region corresponds to the inputted profiles.

5. The method of claim 4, wherein said steps (a)-(h) produce a multimode fiber suitable for use in a CWDM system.

6. The method of claim 4 further including the step of drawing an optical fiber from the preform.

7. The method of claim 4, wherein said steps (a)-(k) produce a multimode fiber suitable for use in a CWDM system.

8. A method of fabricating a near-optimum broadband multimode optical fiber comprising the steps of:
(a) determining desired performance characteristics of the fiber, including at least a core region and a cladding region surrounding said core region, said core region having a refractive index profile $n(r,\lambda)$,
(b) determining desired structural characteristics of the fiber,
(c) determining the numerical aperture and bandwidth of the fiber,
(d) determining I different dopants that will be incorporated into the core region of the fiber, each of said dopants being characterized by a dopant concentration profile,
(e) setting up a numerical code to generate the dopant concentration profiles of each of said dopants by reducing the variation of $z(r,\lambda)$ with respect to wavelength, where $z(r,\lambda) \triangleq n^2(r,\lambda)k_0^2$, is radius, $\lambda$ is wavelength, n is the refractive index of the core region, and $$k_0 = \frac{2\pi}{\lambda}$$

is the wave number,
(f) setting u a numerical code to generate a profile function $f(r,\lambda)$ defined by $f(r,\lambda) = z_0 - z(r,\lambda)$, $z_0 = z(r=0,\lambda)$ and $f(r=0,\lambda) = f_0 = 0$, $f(r=a,\lambda) = f_a = (NA \cdot k_0)^2$, where NA is the numerical aperture of the fiber and r=a is radius of said core region, said profile function satisfying equation (g) below,
(g) setting up a numerical code to generate $$f^{(i-1)} + \frac{r}{2}\frac{\partial f^{(i-1)}}{\partial r} = [df^{(1)}]^{(i-1)}, i = 1, 2, \dots, I,$$

where the $i^{th}$ order derivative of a quantity x with respect to $k_0$ is denoted by $$x^{(i)} = \frac{\partial^i x}{\partial k_0^i}$$

and the parameter d is given by $$d = \frac{Dz_0}{z_0^{(1)}};$$

said profile function $f(r,\lambda)$ being related to said dopant concentration profiles $X_i(r)$, i=1, 2, ..., I by $$f(r, k_0) = \sum_{i=1}^{I} x_i(r)e_i(k_0), \ x_i(r) = X_i(r=0) - X_i(r),$$

(h) setting up a numerical code so that said dopant concentration profiles $X_i(r)$ minimize the metric $\xi$ given by:

$$\xi = \sum_{j=2}^{J} w_j \left\| \sum_{i=1}^{I}\left[r\frac{dx_i}{dr}\right]e_i^{(j-1)}(k_0) - \sum_{i=1}^{I} x_i(r)p_i^{(j-1)}(k_0) \right\|^2$$

where $\|\cdot\|^{l_2}$ is the $L_2$-norm, with $e_i(k_0) = z_{i_R}(k_0) - z_S(k_0)$ where $z_{i_R}(k_0)$ is the z due to a reference amount of dopant concentration for dopant i and is the z due to pure silica; $p_i(k_0) = 2de_i^{(1)} - 2e_i$ and $w_j$ is the weight on the $j^{th}$ order derivative of said profile function $f(r,\lambda)$ (i) setting up a numerical code so that said minimization is subject to the following equality criteria:

$$\sum_{i=1}^{I}\left[r\frac{dx_i}{dr}\right]e_i^{(0)}(k_0) = \sum_{i=1}^{I} x_i(r)p_i^{(0)}(k_0),$$

where $x_i(r)$ is pre-specified for some $r \in [0,\alpha]$, $k_0$ is the wave number, $p_i^{(0)}$ and $e_i^{(0)}$ are the zeroeth order derivatives or matrix elements e and p, and (j) setting up a numerical code so that said minimization is subject to the following inequality constraints:
$x_{i,min} \le x_i(r) \le x_{i,max}$, where $x_{i,min} = X_i(r=0) - X_{i,max}$, $x_{i,max} = X_i(r=0)$, and (k) providing the dopant concentration profiles as inputs to a deposition system that produces an optical fiber preform in which the concentration of each dopant in its core region corresponds to the inputted profiles.

9. The method of claim 8, including setting up a numerical code:
(a) so that the equality criterion:

$$\sum_{i=1}^{I}\left[r\frac{dx_i}{dr}\right]e_i^{(0)}(k_0) = \sum_{i=1}^{I} x_i(r)p_i^{(0)}(k_0),$$

is expressed in matrix-vector form, yielding:

$$r\frac{dx}{dr} = Ax, \; x(r) = \begin{bmatrix} x_1(r) \\ \vdots \\ x_I(r) \end{bmatrix}$$

$$A = E^{-1}P, \; E_{ij} = e_j^{(i-1)}, \; P_{ij} = p_j^{(i-1)}, \; i, j \in \{1, \ldots, I\}$$

where $E_{ij}$ and $P_{ij}$ are the elements of matrices E and P, respectively, in the $i^{th}$ row and $j^{th}$ column and $E^{-1}$ denotes the inverse of matrix E, and (b) to determine whether the I dopants in the core region satisfy the necessary broadband condition that $A=E^{-1}P$ should be a positive semi-definite matrix.

\* \* \* \* \*